US007120685B2

(12) United States Patent
Ullmann et al.

(10) Patent No.: US 7,120,685 B2
(45) Date of Patent: Oct. 10, 2006

(54) METHOD AND APPARATUS FOR DYNAMIC CONFIGURABLE LOGGING OF ACTIVITIES IN A DISTRIBUTED COMPUTING SYSTEM

(75) Inventors: Lorin Evan Ullmann, Austin, TX (US); Rajeeta Lalji Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/891,584

(22) Filed: Jun. 26, 2001

(65) Prior Publication Data
US 2002/0198983 A1  Dec. 26, 2002

(51) Int. Cl.
*G06F 15/173* (2006.01)
(52) U.S. Cl. ..................................... 709/224; 710/18
(58) Field of Classification Search ............... 709/224, 709/204, 223; 714/48, 45; 719/318; 707/10, 707/200; 710/8; 377/26
See application file for complete search history.

(56) References Cited

U.S. PATENT DOCUMENTS

| 4,718,025 | A |   | 1/1988 | Minor et al. ............... 364/550 |
|---|---|---|---|---|
| 4,817,118 | A | * | 3/1989 | Wilburn et al. ............. 377/26 |
| 5,504,921 | A | * | 4/1996 | Dev et al. .................. 709/223 |
| 5,737,600 | A | * | 4/1998 | Geiner et al. ............... 707/200 |
| 5,857,190 | A | * | 1/1999 | Brown ....................... 707/10 |
| 5,903,759 | A | * | 5/1999 | Sun et al. ................... 717/128 |
| 5,916,300 | A | * | 6/1999 | Kirk et al. .................. 701/213 |
| 5,974,573 | A | * | 10/1999 | Martin ........................ 714/48 |
| 6,002,871 | A | * | 12/1999 | Duggan et al. ............. 717/135 |
| 6,430,616 | B1 | * | 8/2002 | Brinnand et al. ........... 709/224 |
| 6,470,388 | B1 | * | 10/2002 | Niemi et al. ................ 709/224 |
| 6,658,470 | B1 | * | 12/2003 | deBardelaben .............. 709/224 |
| 6,738,832 | B1 | * | 5/2004 | Burr et al. .................... 710/8 |
| 6,871,228 | B1 | * | 3/2005 | Shah et al. .................. 709/224 |
| 6,879,995 | B1 | * | 4/2005 | Chinta et al. ............... 709/204 |
| 2005/0028171 | A1 | * | 2/2005 | Kougiouris et al. ........ 719/318 |
| 2005/0138083 | A1 | * | 6/2005 | Smith-Semedo et al. ... 707/200 |

OTHER PUBLICATIONS

Netzer, Robert H.B., "Adaptive Message Logging for Incremental Replay of Message-Passing Programs", ACM Press New York, USA, Year of Publication: 1993.*

* cited by examiner

*Primary Examiner*—John Follansbee
*Assistant Examiner*—Dustin Nguyen
(74) *Attorney, Agent, or Firm*—Jeffrey S. LaBaw; Anne Vachon Dougherty

(57) ABSTRACT

A system and method for implementing tracking of computing system activities wherein the tracking can be dynamically adjusted. The system provides a multiple level logging system having a first level for detecting message level errors and a second trace level for obtaining trace information and for filtering same to provide more details to be used for implementing corrective action. A set of filters is provide to further refine the data which is provided to a user/system administrator. The system also provides for selective activation of tracking and logging for selected subsystems, as well as the ability to vary the frequency at which the tracking is performed. The frequency of logging can be adjusted upward in response to detection of a error and can then be decreased, or the tracking selectively disabled or entirely stopped upon detection of a stop event.

22 Claims, 7 Drawing Sheets

✓ Transient High Frequency Logging Configuration GUI

When to Enable Transient High Frequency Logging:
  ∅ Run Periodic Detection
   • Daily        time of day   = ____
   • Monthly      day of month  = ____
   • Continuous   Polling interval every ___ minutes ∅ Enable immediately as response to ALL Error Message (very expensive from a performance standpoint)

∅ Select Subsystem(s) which error events turn on temporary tracing
        Subsystem DropDown:   Directory
                              IP Driver
                              ORB
                              Etc.

Duration of Transient High Frequency Logging:
  ∅    (default) 1 hour after error message
  ∅    Indefinite until Administrator turns off tracing

FIG. 4

METHOD AND APPARATUS FOR DYNAMIC CONFIGURABLE LOGGING OF ACTIVITIES IN A DISTRIBUTED COMPUTING SYSTEM

FIELD OF THE INVENTION

This invention relates to distributed computing systems and more particularly to a system and method for providing dynamically adjustable logging of activities and filtering of log records for a computing system.

BACKGROUND OF THE INVENTION

In order to provide support services for computing systems, ideally one would like to have a trace record of all of the activities which have occurred at a node or machine. For personal computers operating in standalone fashion, such tracking or recording of actions may be realistic. Some computer code does provide for the continual logging and tracing of all activities, typically using a log component as well as a tracer. Should an error occur and an error message be generated, then there exists a complete record of activities which can be pulled up by a debug program and can be reviewed to determine the source of the problem. If such a logging and/or tracing record exists, it eliminates the need for a customer to recreate the problem, a process which is unpredictable and time-consuming. The log records provide both a time frame and a task or entity identification of the source of the error. Again, when dealing with one computer operating in standalone mode, it can readily be ascertained whether the problem arose from user error (e.g., a misspelling on the input) or from a bug in a part of the code, and the problem can be addressed.

The trade-off for providing thorough logging and tracing of actions is, of course, a decrease in performance of the overall system, since resources are being dedicated to the tracking tasks and are not, therefore, available for actual execution of tasks. Furthermore, once the computing system goes beyond standalone operation and begins interacting with other entities (not only computers, but also computer peripherals, PDAs, etc.) then the tracking becomes more complex and the potential sources of error multiply almost exponentially. When one envisions servicing a large-scale distributed computing system, having thousands of nodes, or endpoints, the desirability of tracking is far outweighed by the complexity of the tracking and by the performance losses associated with trying to log and trace every action.

A detailed discussion of distributed network services can be found in copending patent application, Ser. No. 09/738,307 filed Dec. 15, 2000, now U.S. Pat. No. 6,950,874 entitled "METHOD AND SYSTEM FOR MANAGEMENT OF RESOURCE LEASES IN AN APPLICATION FRAMEWORK SYSTEM", the teachings of which are herein incorporated by reference. In addition, the specifics of the logging capabilities of a server in a distributed computing system can be found in co-pending patent application Ser. No. 09/895,979, filed Jun. 29, 2001, now U.S. Pat. No. 7,039,921 entitled "Methods and Apparatus in a Logging System for the Tracking of Tasks Based on Function for Data Analysis, the teachings of which are also incorporated by reference herein (AUS920010501)

What is desirable, and is an object of the present invention, is to provide a system and method whereby the logging and tracing of computing activities in a distributed computing system can be selectively enabled and/or adjusted.

It is another object of the present invention to provide a system and method whereby the frequency of logging of computing activities can be dynamically adjusted in response to user or system input.

Yet another object of the invention is to provide a multiple level logging system for which both the frequency and the degree of logging can be adjusted.

Still another object of the invention is to provide dynamic and configurable filtering of log information based on user or system input.

SUMMARY OF THE INVENTION

The foregoing and other objectives are realized by the present invention which provides a system and method for implementing tracking of computing system activities wherein the tracking can be dynamically adjusted. The system provides a multiple level logging system having a first level for detecting message level errors and a second trace level for obtaining trace information and for filtering same to provide more details to be used for implementing corrective action. A set of filters is provide to further refine the data which is provided to a user/system administrator. The system also provides for selective activation of tracking and logging for certain subsystems, as well as the ability to vary the frequency at which the tracking is performed. The frequency of logging can be adjusted upward in response to detection of a error and can then be decreased, selectively disabled, or stopped, after detection of a stop event.

BRIEF DESCRIPTION OF THE DRAWINGS

The invention will now be described in greater detail with specific reference to the appended drawings wherein:

FIG. 4 provides a sample graphical user interface output for configuring the THFL in accordance with the present invention;

DESCRIPTION OF THE PREFERRED EMBODIMENT

Figure 1:
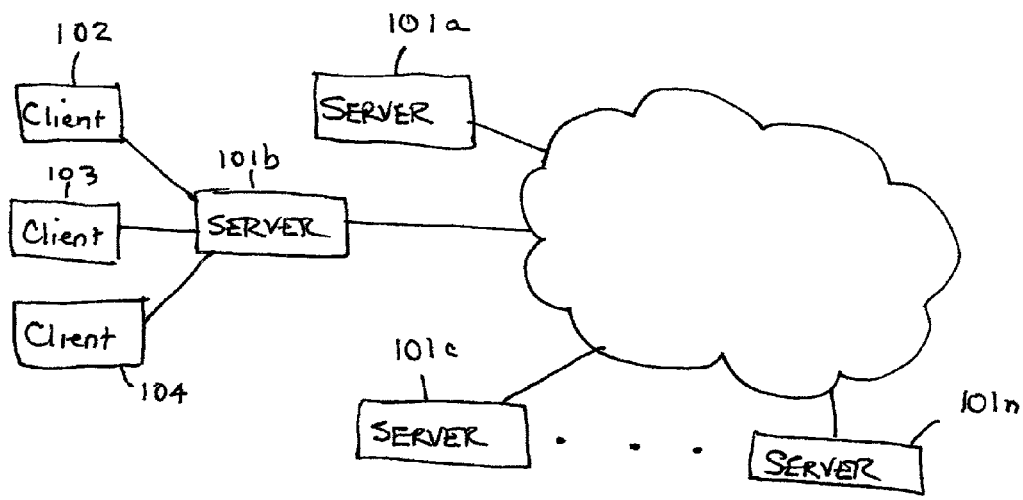
FIG. 1 provides a schematic representation of a distributed network in which the present invention may be implemented.

The present invention can be implemented in any network with multiple servers and a plurality of endpoints; and is particularly advantageous for vast networks having thousands of endpoints and links therebetween. As discussed above, FIG. 1 provides a schematic illustration of a network in which the present invention may be implemented. The illustrated system includes a plurality of servers, 101a–101n, as well as a plurality of client machines, 102–104. Among the plurality of servers, 101a–101n as illustrated, at least one of the servers, 101a in FIG. 1, having distributed kernel services (DKS) may be designated as a control server for itself (i.e., its own object request broker, "ORB") or for a plurality of ORBs (i.e., a plurality of machines). While each client and server machine may have the capability of performing its own tracking, the present invention could be implemented at the control server level wherein a control server (e.g., 101b) would perform the tracking for a plurality of client machines (e.g., 102–104) or would gather tracking data from each of a plurality of machines for interfacing with a service entity.

Figure 2:
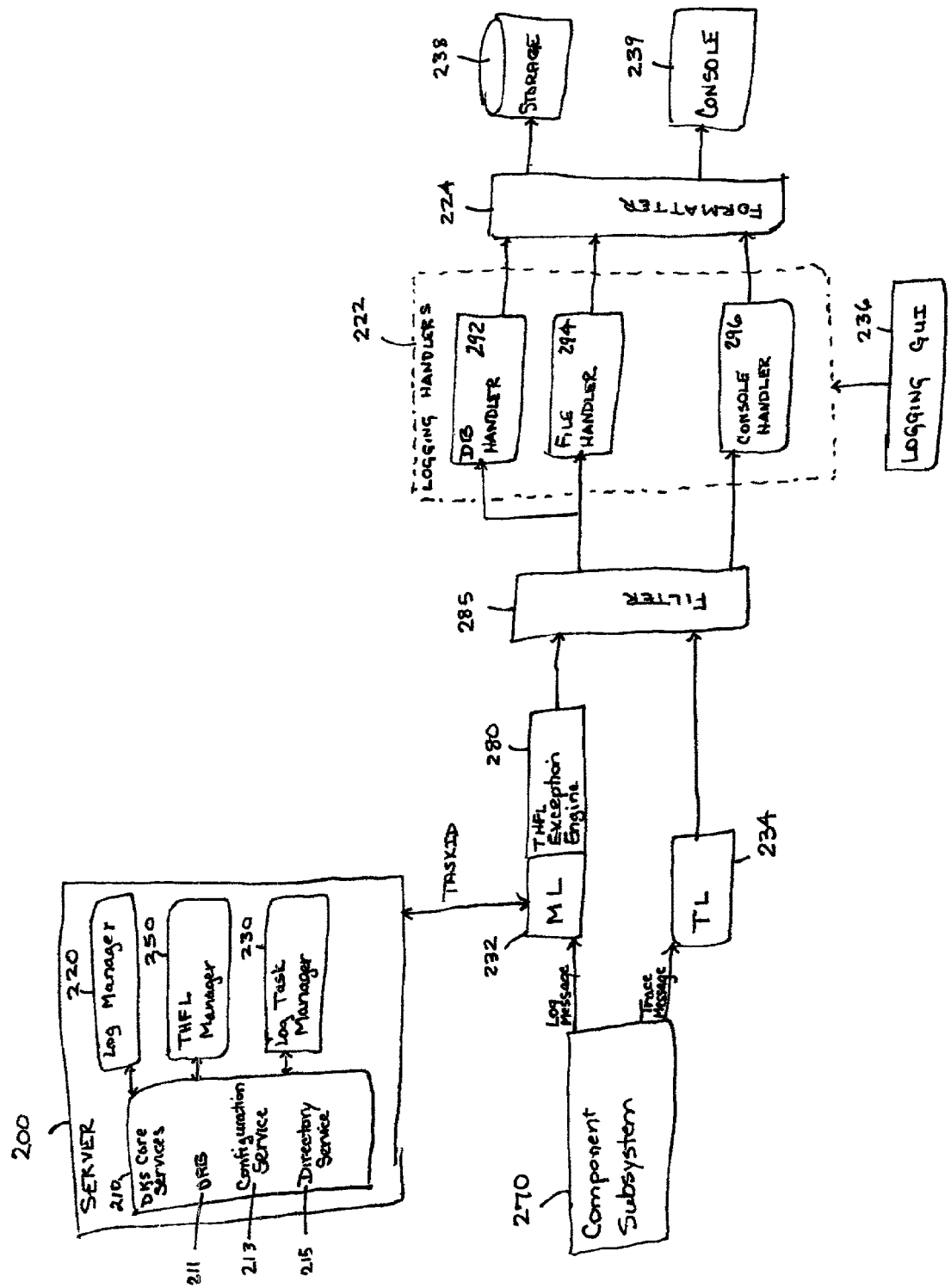
FIG. 2 provides a schematic representation of server and distributed tracing components for use in the present invention.

FIG. 2 provides a schematic representation of server components for use in the present invention. As depicted in even greater detail in the aforementioned copending patent application, each server in the distributed computing system 200 includes a log manager 220 which creates and configures all logging objects. The log manager 220 is coupled to the DKS core service entities 210, including the object request broker (ORB) 211, the configuration service 213, and the directory service 215. The message logger 232 and trace logger 234 are configured by the log manager 220 to receive input from the log task manager 230 in order to respond to component and application requests from the component subsystem 270 to send log messages. The loggers create log records which encapsulate the message and trace data generated from an application. The logging handler 222, including for example DB handler 292, file handler 294, and console handler 296, direct the log records recorded by the message logger 232 or trace logger 234 to a configured destination such as to a file at server 200, at a client 102–104, or at, database 238, to a console screen 239, or to another destination. The logging handler 222 received input from the logging GUI 236 to determine the appropriate handing. Logging formatters 2211 format the output of information contained in the log, such as tailoring data and time stamps to local conventions. The logging subsystem can react to both local application component requests as well as to remote application component requests from within the computing system. The logging formatters 224 are software objects that format messages recorded by a logger for consumption by a user/consumer, a subsystem (e.g., a debugger), or a system service administrator. The DKS core services 210 provide the log manager 220 with the configuration information for directing messages via the logging handler 222.

The log manager 220 receives input from the log task manager 230 which is adapted to provide multiple levels of logging responsive to input from the message logger 232 and the tracer 234. The message level logging is the existing system functionality whereby high level messages are generated by the system in order to notify the user that certain conditions exist. Specifically, high level messages may include informational messages (e.g., "This operation will be completed in approximately 3 minutes"), warning messages (e.g., "The available RAM is dangerously low"), and error messages (e.g., "An error has occurred in this program") which the log task manager 230 outputs as per the input from the logging graphical user interface, GUI 236, for user notification. The trace logger 234 provides more refined data including a log of all activities over a period of time. The actual "readings" which are obtained from a subsystem are generally sent by a local message logger (not shown), however the logging handlers 222 also can be remotely located at or near the subsystem to be monitored.

The logging output from the message logger and the tracer may additionally be provided for storage in at least one location, shown as database 238. Additional logging system components include a plurality of filters, shown as 285, which can be implemented at various locations in the logging system. The filters can be applied to loggers, to handlers, or to both loggers and handlers. When applied to a logger, the filter determines which types of message and trace records are to be processed by the logger. When applied to a handler, the filter determines which types of message and trace records are to be sent to a destination. The filters work by comparing a log record type against a set of criteria, or a query, contained within the filter.

Figure 3:
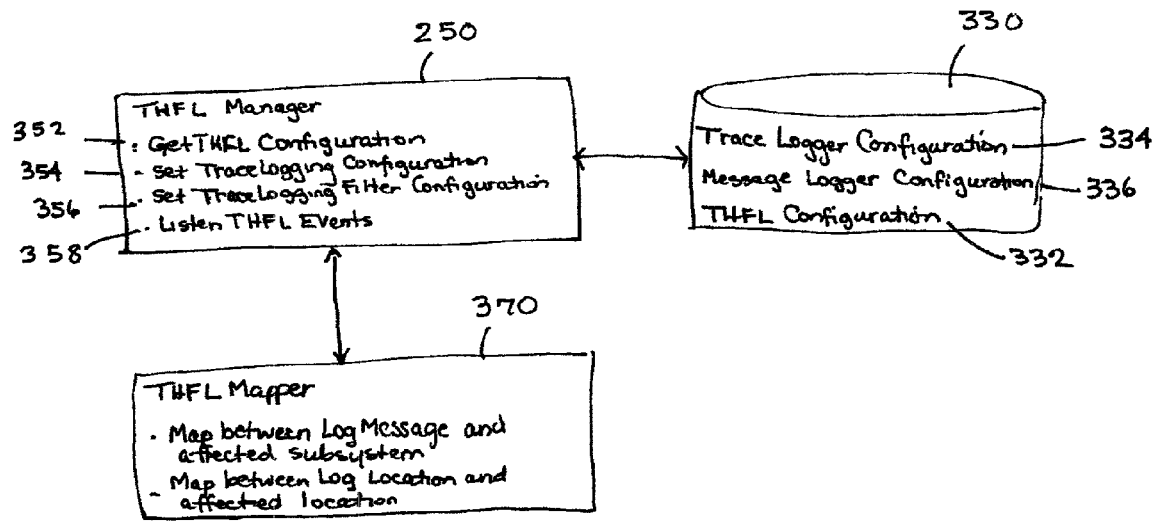
FIG. 3 provides a schematic representation of the THFL architecture for implementing the present invention.

As discussed above in the Background Section, to provide continual monitoring with logging and tracing of all computing system activities is unduly burdensome and adversely impacts performance objectives. Therefore, what is provided is a variable logging frequency monitor feature which implements selective control of the message logging, the tracing, and of the filtering of the logger and tracer output at the illustrated transient high frequency logging (hereinafter, "THFL") manager 250. The THFL manager architecture is illustrated in greater detail in FIG. 3. The listenTHFLEvents component 356 is the component which "listens" at runtime for messages from the message logger (232 of FIG. 2) signaling that an event has occurred. While instructional, warning and error messages can be detected, it is expected that the THFL manager will only generate a response to the error messages. Clearly, the system can be adapted to generate a response to other messages (particularly to warning messages which may signal an imminent error), the details of which will not be described herein but will be readily apparent to one having skill in the art from a reading of the ensuing description. The listenTHFLEvents component will receive a message from the message logger directly or through the log task manager and will prompt THFL manager actions based thereon. In response to detection of an THFL event, the other components of the THFL manager will execute their respective tasks.

The THFL Mapper 370, which is illustrated as a separate component, but could also be incorporated into the THFL Manager, determines the location of the error based on the error log message which has been detected by the listenTHFLEvents component 356. Once the THFL Mapper has received an error log message, it determines the affected subsystems and the affected locations and provides that information to the THFL manager for use in adjusting the logging in response to the error. The THFL mapper may additionally identify related subsystems which may also be affected by (or be causing) the problem and provide that information to the THFL manager.

The THFL manager 250 additionally includes a component 352 for getting the transient high frequency logging (THFL) configuration information from database 330. The THFL configuration 334 is predetermined and provides the logical configuration of subsystems from which a subset can be chosen based on the THFL event which has been detected. The component labeled setTraceLoggingConfiguration at 354 responds to the event detection by setting the logging and tracing configuration based on the detected event. For example, if an error event has been detected in the e-mail subsystem, then tracing will be enabled for that subsystem. If tracing is already enabled, for example on a periodic or continual monitoring schedule, the setTraceLoggingConfiguration component may adjust the frequency of logging and tracing so that more frequent readings are obtained for a period of time to better isolate the location and nature of the problem. The Trace Logger Configuration 334 and Message Logger Configuration 336 are stored at database 330 and can be accessed by both the THFL components and the THFL Mapper in order to activate or adjust the logging functionality at the affected subsystems. The setMessageLoggingFilterConfiguration component 356 responds to the error message by altering the filtering, as discussed above, to tailor the gathered information to best identify the nature of the problem and best characterize the information for use by the customer or service representative.

The components of the THFL manager act on preset information which has been programmed in by a system administrator. FIG. 4 provides a sample graphical user interface for configuring the THFL in accordance with the present invention. The illustrated configuration GUI is a representative GUI and clearly can be modified based on logging frequency and filtering standards which are desired for the system, keeping in mind the performance considerations. Sample variables for the THFL configuration which are depicted include the temporary tracing setting, trigger event identification, and duration of logging. When configuring the THFL, a system administrator can set so-called temporary trace logging to be continually enabled, enabled on a periodic polling basis, enabled once daily, enabled hourly, or enabled monthly. System load and performance considerations will clearly weigh into the configuration decisions. As a system grows, the system administrator can alter the settings to accommodate any changes to actual performance or performance standards simply by invoking the THFL Configuration GUI and changing the settings.

The THFL configuration GUI of FIG. 4 also provides a sample list for identifying what detected events will be trigger events for invoking the THFL manager and its functionality. As illustrated, the system may be set to respond to all log error messages, which is very expensive from a performance standpoint. Alternatively, the system may be set to respond only to exception or error messages related to selected subsystems. As noted above, the system may also be set to respond to warning messages.

Finally, the illustrated THFL configuration GUI provides a setting for the duration of automatic trace logging once the logging has been enabled in response to a detected error event/message. The system administrator can preset the duration of temporary trace logging (e.g., one hour as illustrated) or can set the system to continue temporary logging until the administrator instructs the system to turn the temporary trace logging off, presumably after the error has been isolated and reviewed.

Figure 5A:
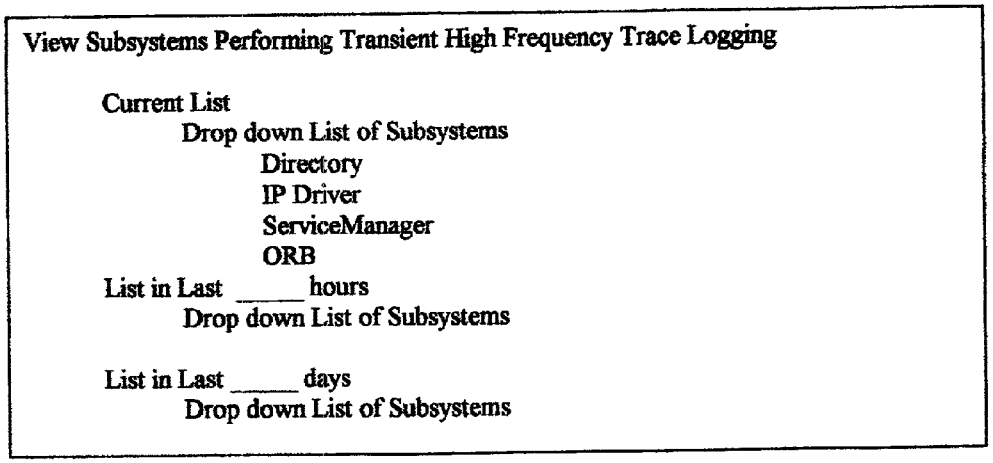
FIGS. 5A and 5B provide sample graphical user interface outputs for use in failure analysis in accordance with the present invention.
Figure 5B:
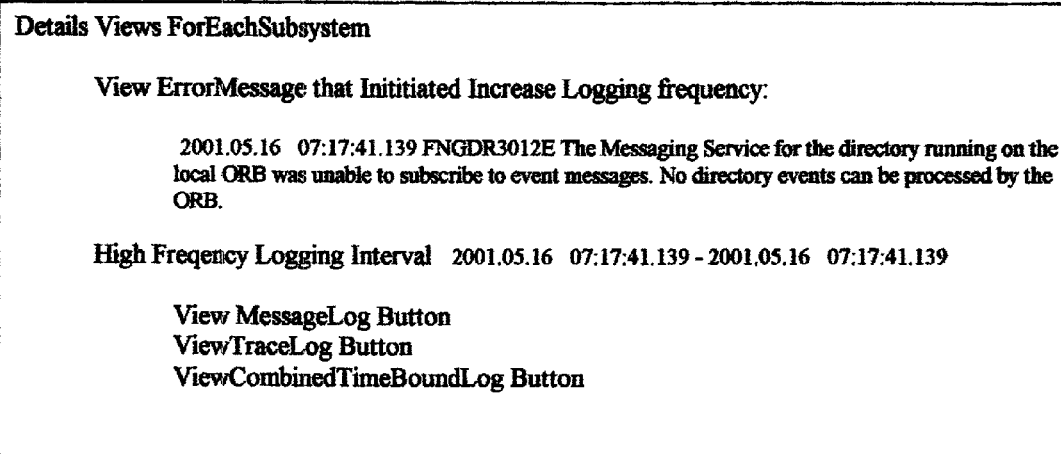

FIGS. 5A and 5B provide sample graphical user interface outputs for use in failure analysis in accordance with the present invention. A system administrator, user, technical support advisor, or even a computer program can access the logging output for the selected subsystem for analysis. FIG. 5A shows the GUI provided to an entity doing failure analysis to view the temporary trace data for one or more subsystems. The illustrated GUI provides a drop down list of the subsystems which are currently being monitored. In addition is provides historical data comprising lists of the subsystems for which temporary trace logging was invoked during a designated number of hours or days. Such historical information is very helpful when sporadic problems occur in order to reveal some pattern of system behavior which would not otherwise be apparent.

FIG. 5B illustrates a GUI output for a particular subsystem which has been the subject of temporary trace logging in response to an error message. For each subsystem, a system administrator, user, technical support advisor, or computer program can view the error message that initiated the logging response, can ascertain the logging interval, with exact times, can view the message log, and can view the trace log. Clearly, viewing the trace log will provide the information most needed for diagnosing and addressing the problem.

Figure 6:
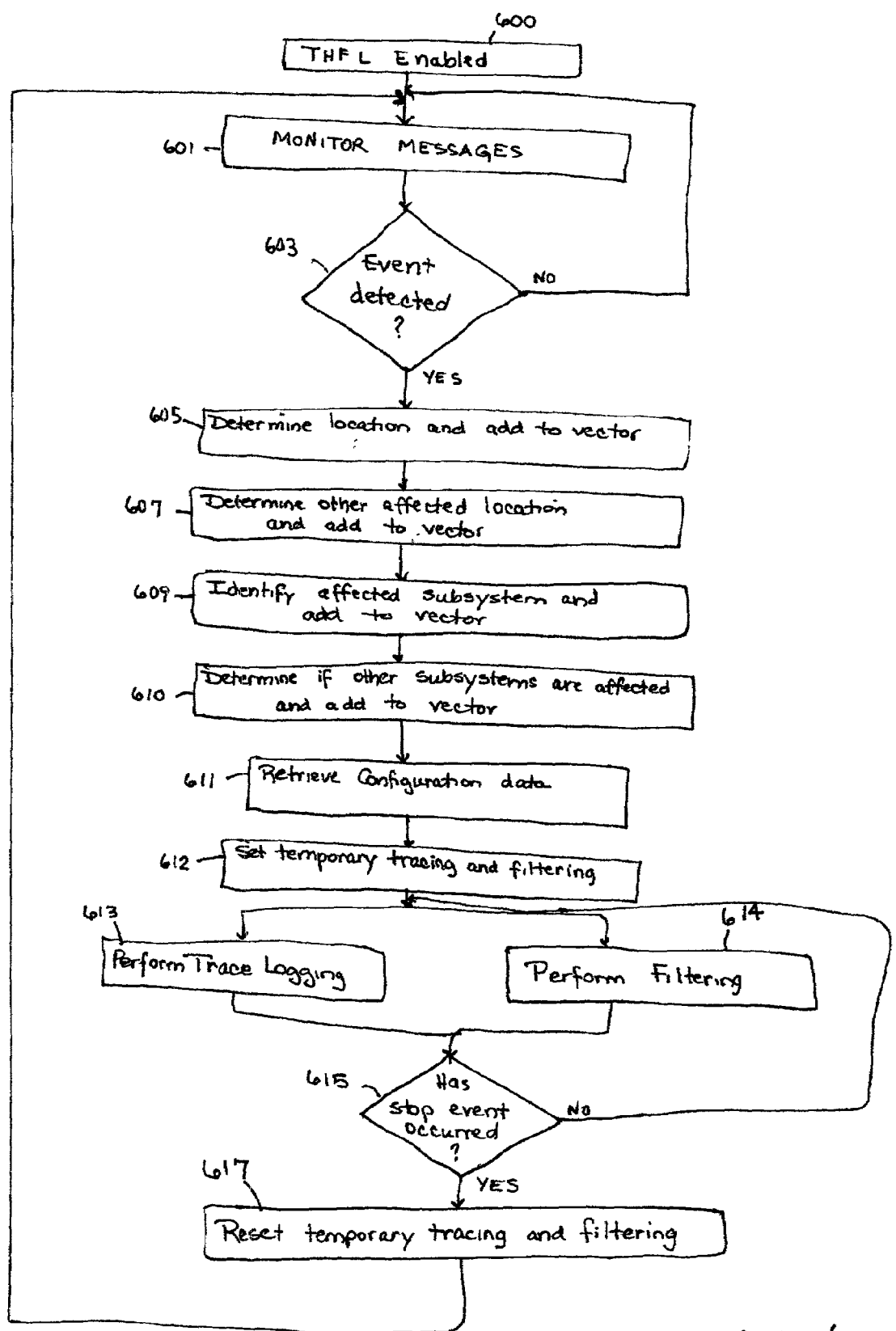
FIG. 6 provides a flowchart depicting a first representative process flow for the selective trace logging in accordance with the present invention.

FIG. 6 provides a flowchart depicting a first representative process flow for implementation of the present invention. Once the THFL has been enabled (at 600), the listenTHFLEvents component begins monitoring the message logs at 601. The monitoring may comprise connecting to a message log database or requesting a message log file. If no error event (or other trigger event) has been detected, as determined at decision box 603, the system continues to monitor at 601. If, however, an error event (or other trigger event) is detected at 603, the system will determine the location from which the error message was generated at 605, which is the location (i.e., the ORB id) of the local logging manager for which the log message file is being examined. The THFL manager then creates an errorLocationVector and adds the location to the vector. Next, at 607, the THFL mapper determines if other locations are affected by the detected trigger event. For each location which is affected by the error, that location (and its ORB id) will be added to the errorLocationVector at 607. While the location may have been pinpointed, the system must at 609 determine the identity of the affected subsystem by using the error message id. For example, from the message "2001.05.16 07:17: 41.139 FNGDR3012E" the messaging service for the directory running on the local ORB was unable to subscribe to event messages. No directory events can be processed by the ORB", it can be discerned that FNG indicates that the message is from the DKS, and DR pinpoints that the directory service was the affected subsystem. The THFL mapper finds the affected subsystem as well as any other impacted subsystems and adds their locations to the vector at 610 using the task ID which is provided in each error message record.

Once the subsystems have been identified, the system loops through stored configuration data for each of the identified locations/subsystems to determine what handling has been prescribed for each affected location subsystem. In addition, the ORB ID is fetched so that the relevant logger can be activated and or altered. THFL configuration data is retrieved at 611 as well as the trace logger configuration data at 334 and the message logger configuration data at 336 from the database 330 of FIG. 3. Thereafter, based on the retrieved configuration data, the THFL manager components set or adjust the trace logging and message logging filtering at 612 and the logging and filtering are performed at 613 and 614. As per the THFL configuration data, a stop event must occur before the temporary trace logging will be discontinued or scaled back. The stop event may be the relevant time period which will be set and automatically monitored at 615. Alternatively, the "stop temporary trace logging?" decision can be determined based on user input, as discussed above. If the time has not elapsed, or the user/system administrator has not indicated that logging should cease, the system continues with steps 613 and 614. If however, the stop event has been detected, the trace logging and the filtering are reset at 617.

Figure 7:
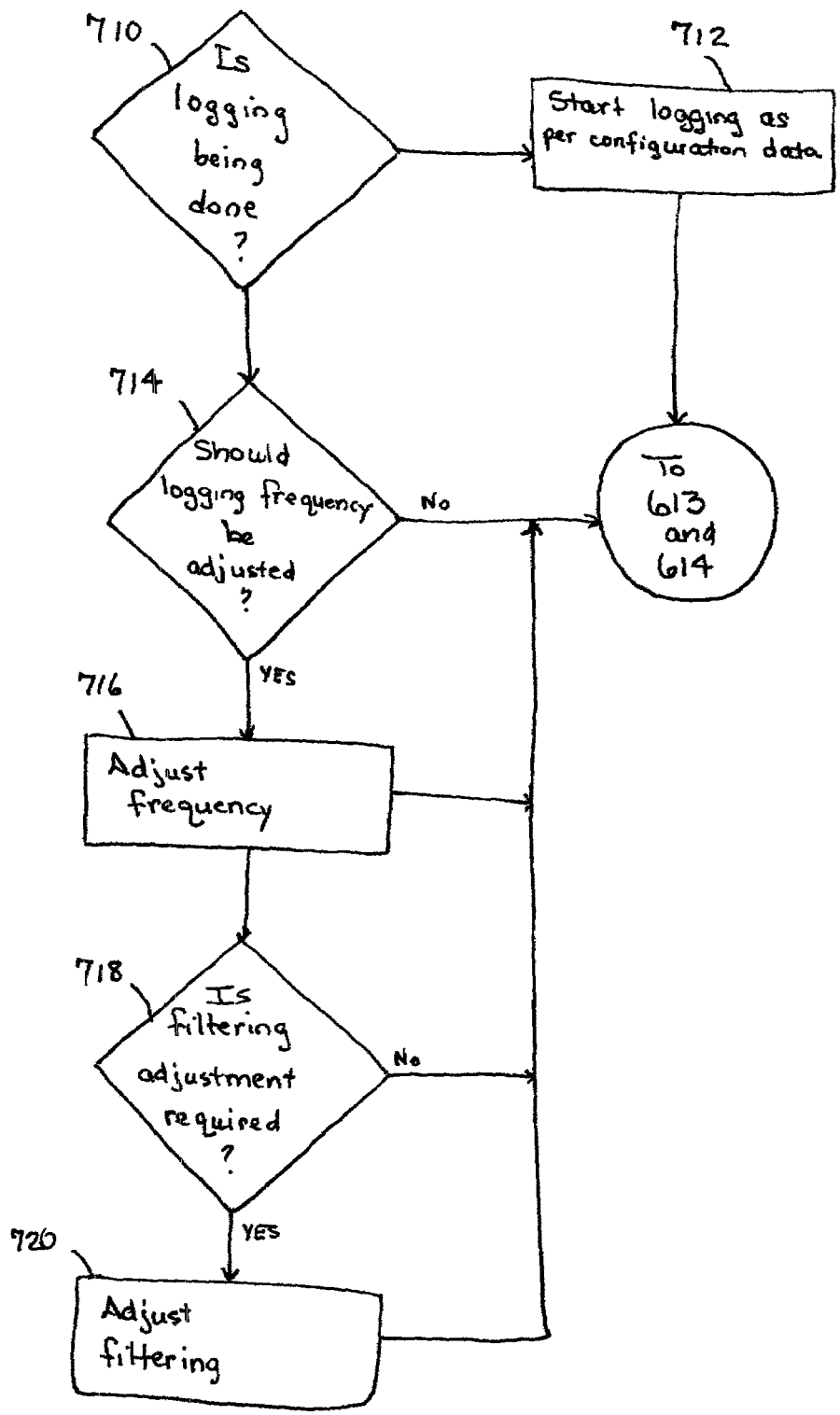
FIG. 7 provides a flowchart depicting an alternative representative subprocess flow in accordance with the present invention.

FIG. 7 provides a flowchart depicting a representative subprocess flow in accordance with the present invention. When the THFL manager has retrieved the necessary configuration data at 611, it then must set the temporary tracing and filtering in accordance with the configuration data. While the configuration data may simply indicate that the trace logging and filtering be enabled, as noted above, the functions may already be enabled and may require frequency adjustment, at least for a time. FIG. 7 illustrates a subprocess flow which may be conducted as part of the step at 611 of setting the temporary tracing and filtering. At step 710, the THFL manager will determine if logging/tracing is already occurring. If not, simply activating the loggers at 712 will be adequate. If logging is already enabled, however, it may be necessary to adjust the frequency of logging based on the error event and in accordance with the configuration data. At step 714 a determination is made as to whether the logging frequency should be adjusted. If no adjustment is needed, the THFL manager simple allows the current logging to continue. If, on the other hand, a frequency adjustment is warranted, the frequency is adjusted at 716.

Another key determination is whether filtering should be adjusted based on the error event detection. If it is determined at 718 that a filtering adjustment is required, that adjustment is made at 720, and the THFL manager proceeds with its logging, filtering, and monitoring for a stop event. The configuration data may also indicate that gradual adjustments be made to both the frequency of logging and the type or degree of log filtering. If such gradual adjustments are necessary, the THFL manager will not only monitor for the occurrence of a stop event, but also for the occurrence of a timed adjustment event (not shown) with resetting of tracing and filtering as required by the configuration data.

Tracing can additionally be triggered by an exception message which is received at the THFL manager. When an exception message is detected, tracing will begin at the indicated location. However, given the nature of an exception message, which may originate at the one component at which a task is executing and then be propagated back to the other components at which the previously task executed, a plurality of exception messages may be provided to the THFL manager from a plurality of components/locations, when in fact only one exception event has occurred. Therefore, it is most advantageous upon receipt of an exception message to utilize existing system resources, specifically the "dump stack", to trace back to component at which the task started, and, once that starting location has been identified, turn off tracing at the starting location.

Figure 8:
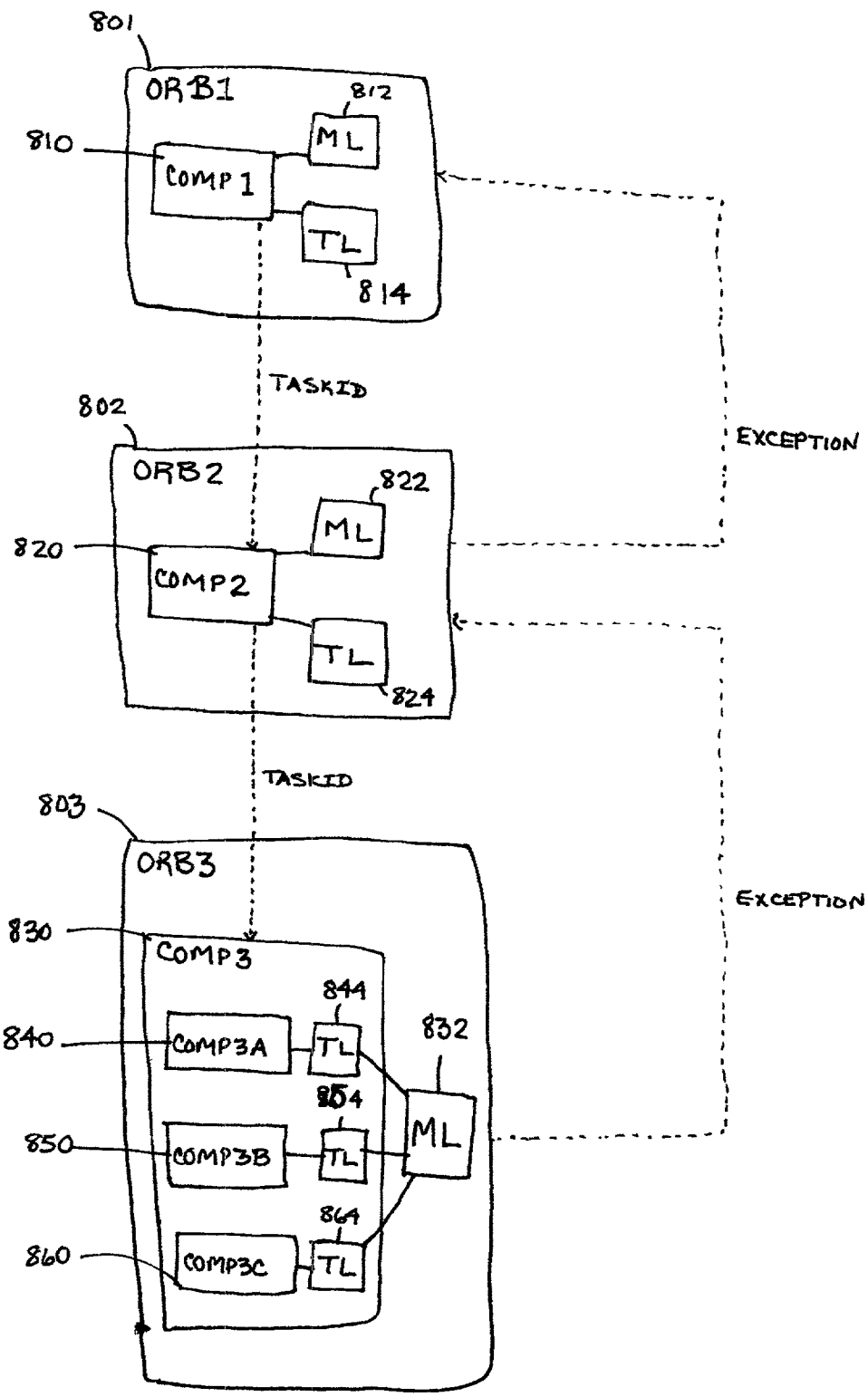
FIG. 8 provides a schematic representation of components illustrating tracing with an exception event in accordance with the present invention.
Figure 2A:
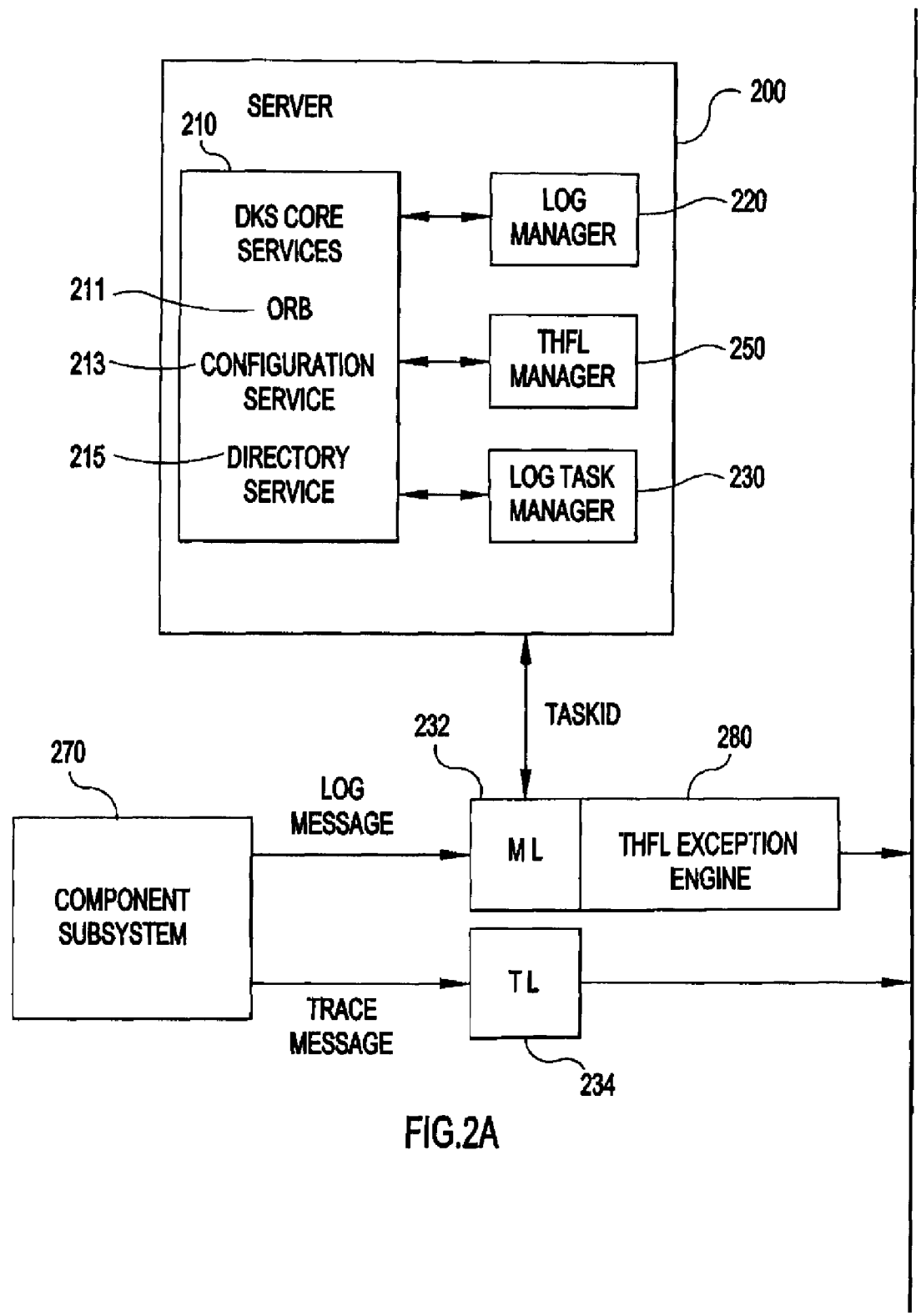
Figure 5A:
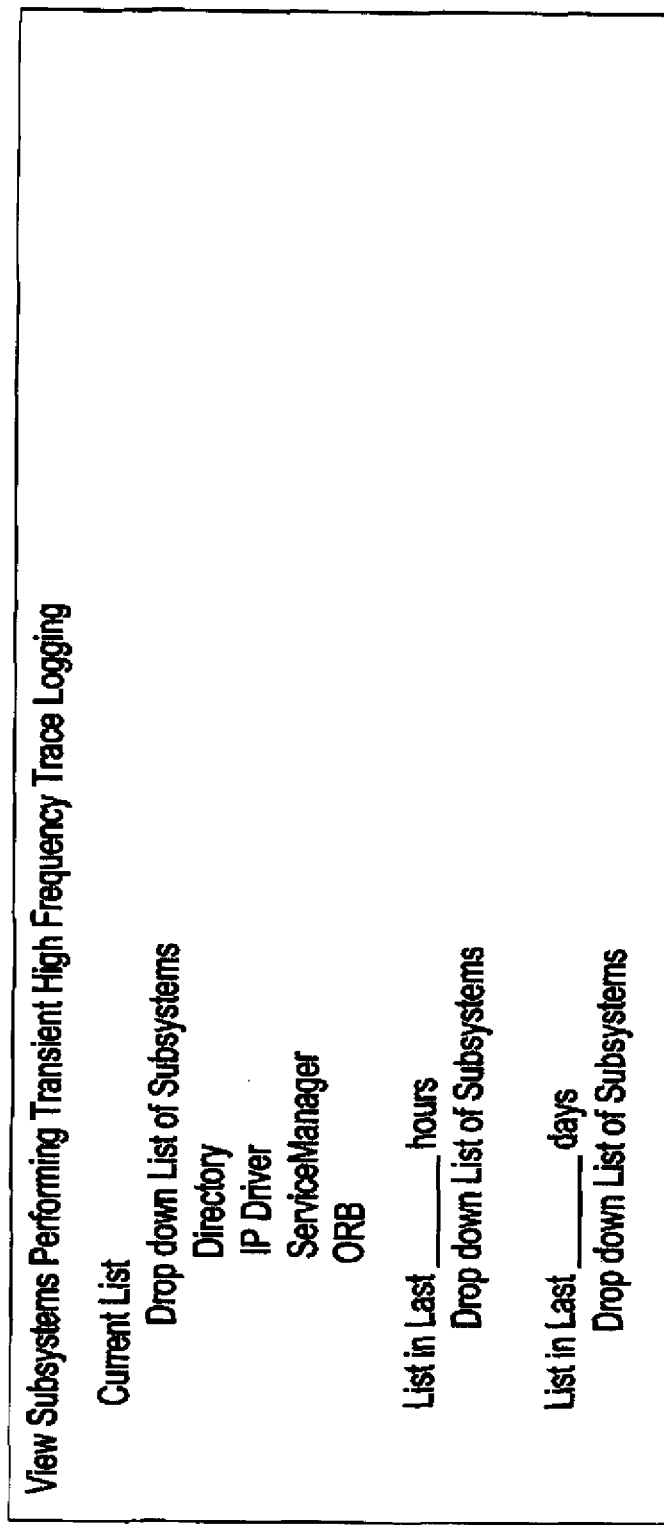
Figure 7:
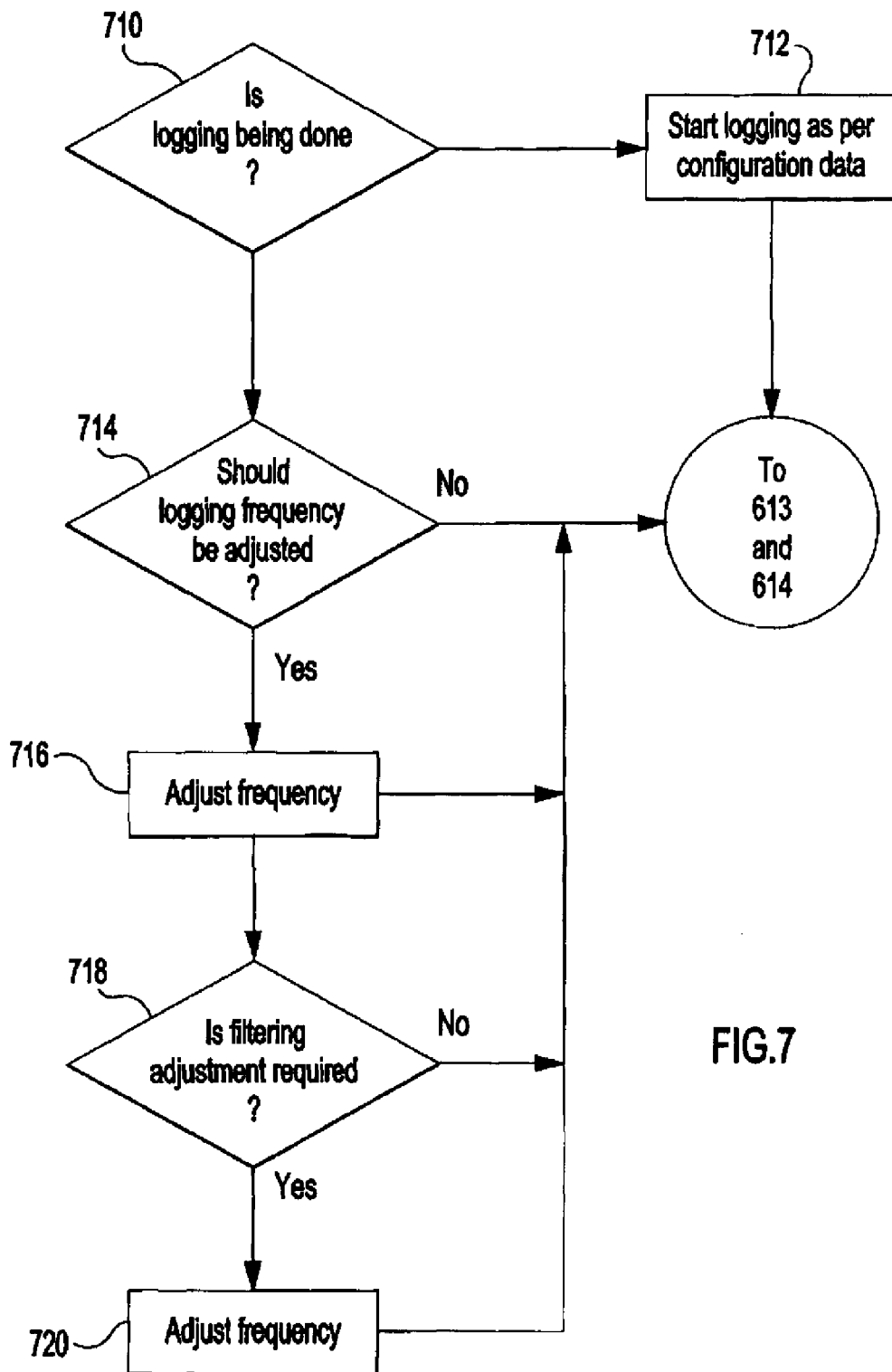
Figure 8:
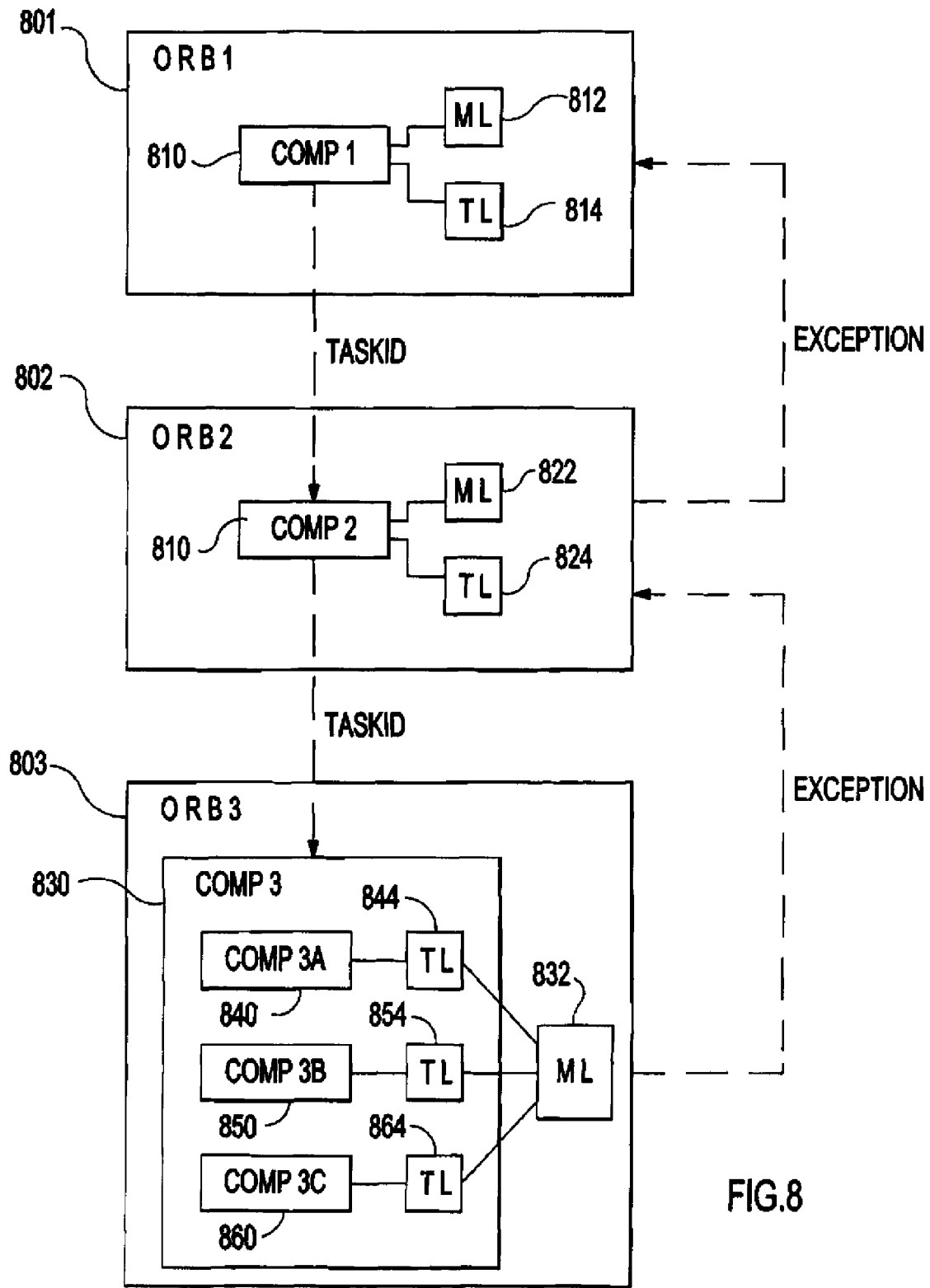
Figure 2A:
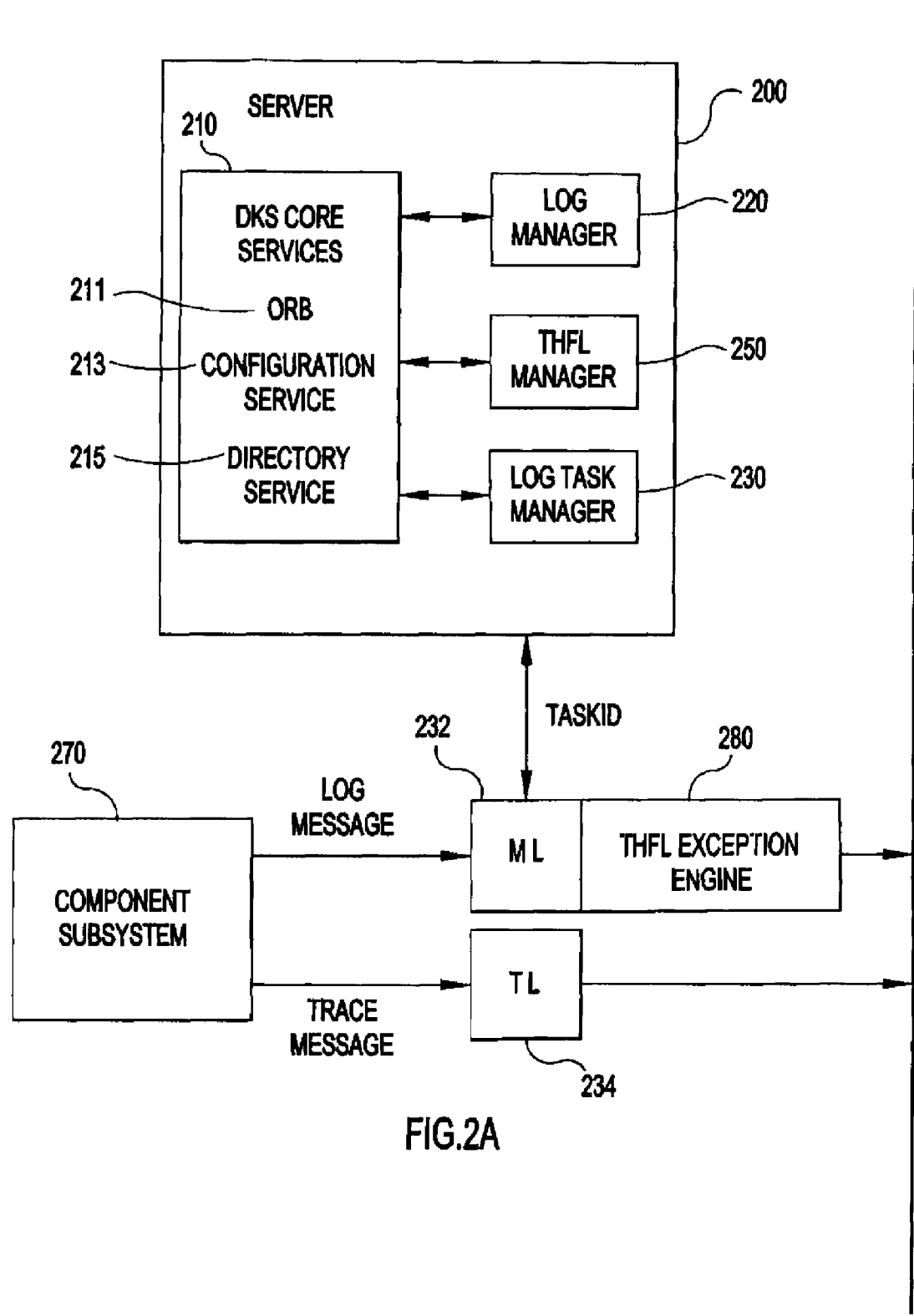
Figure 2:
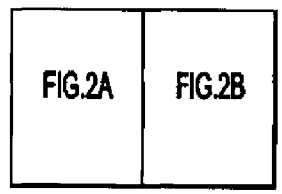
Figure 2B:
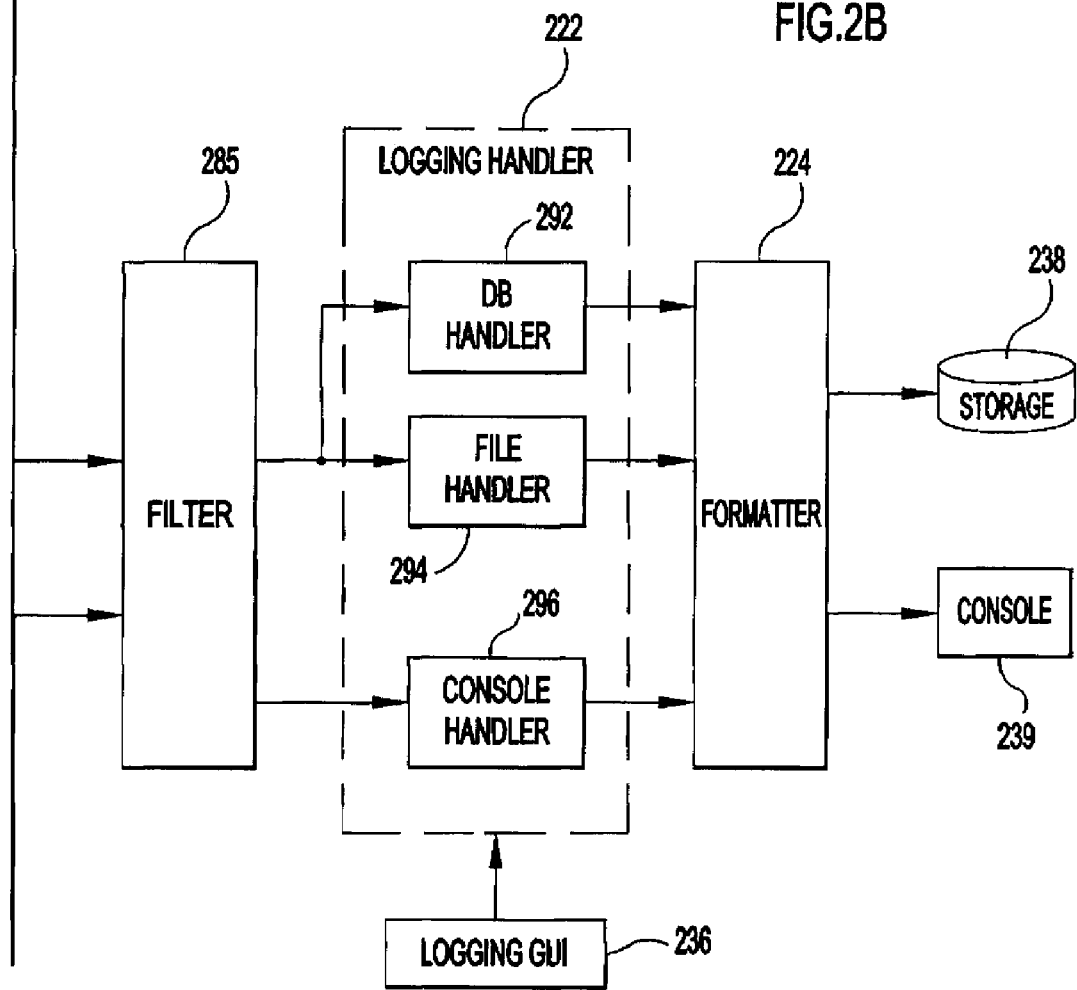
Figure 6:
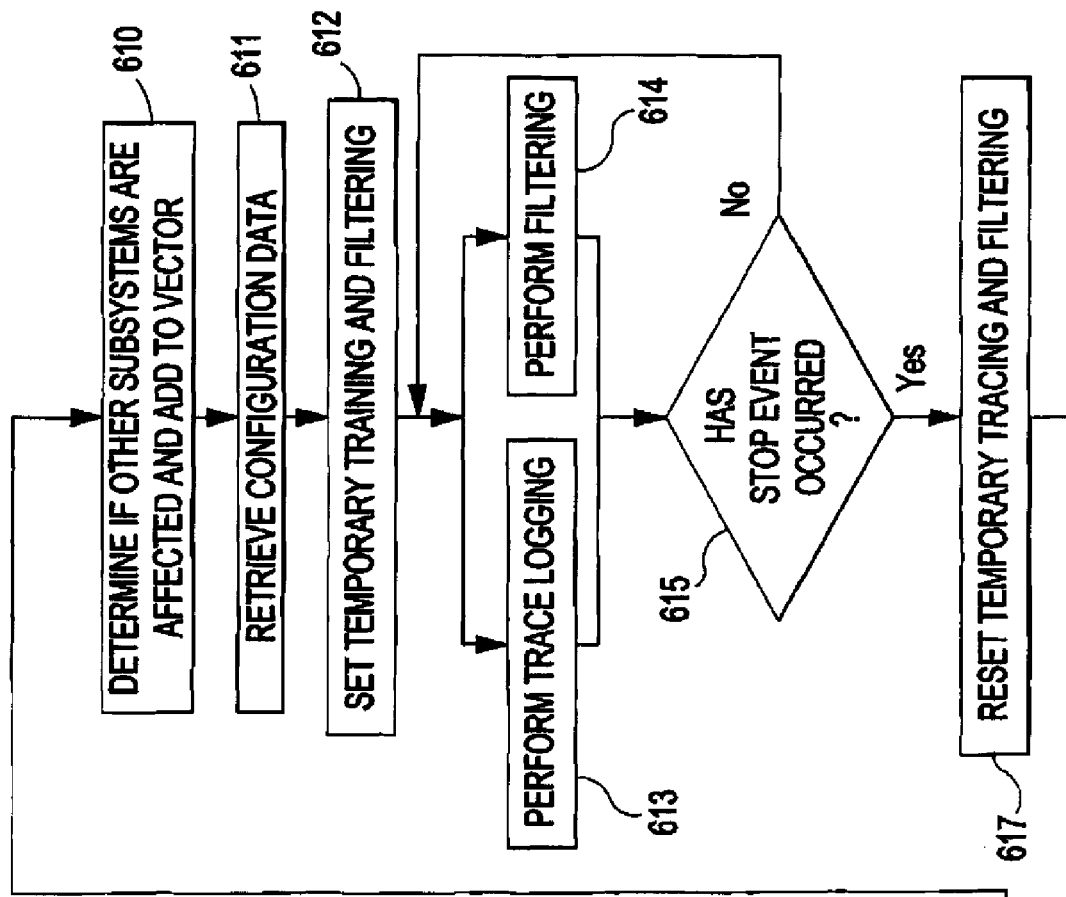
Figure 7:
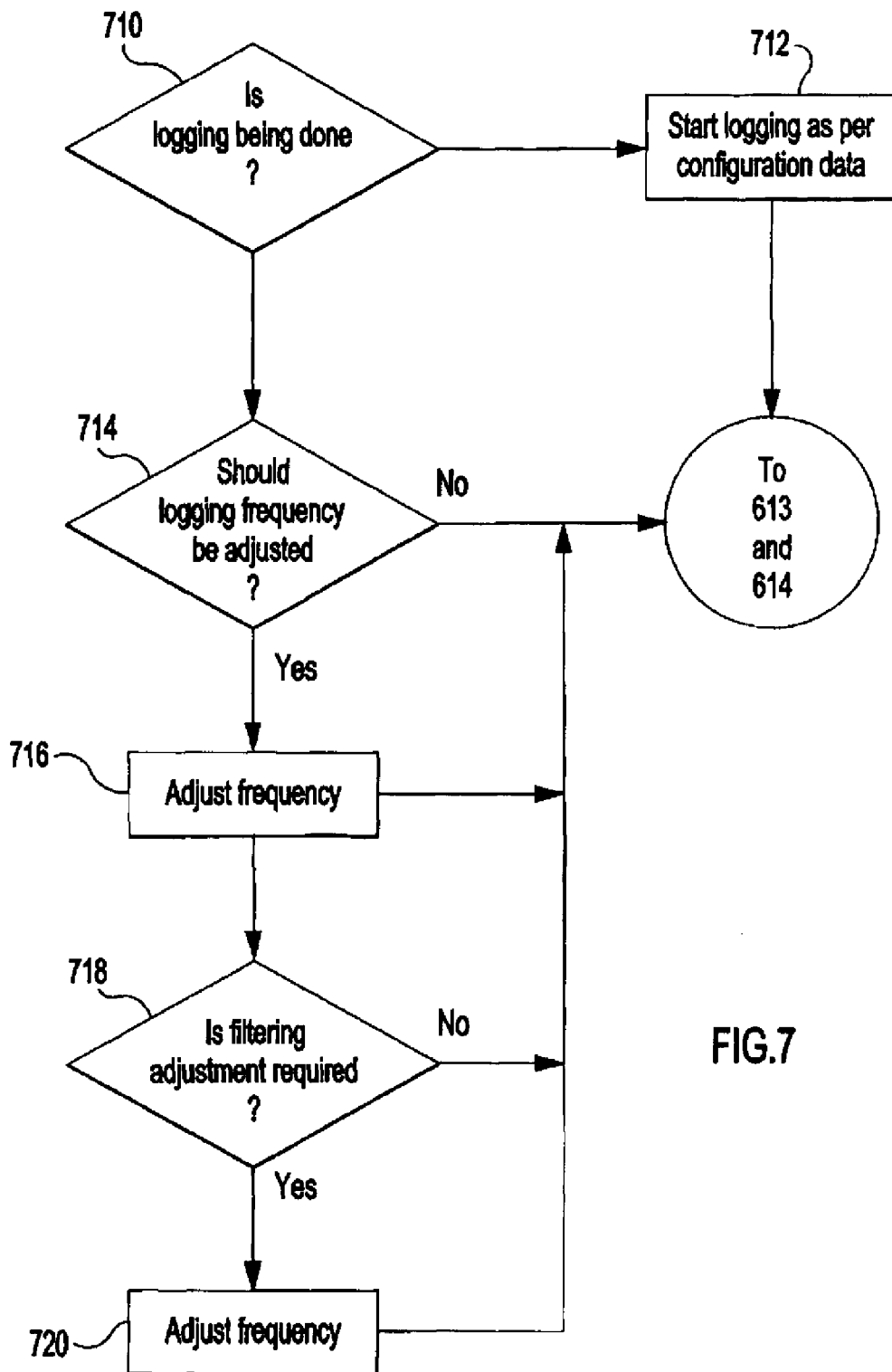
Figure 8:
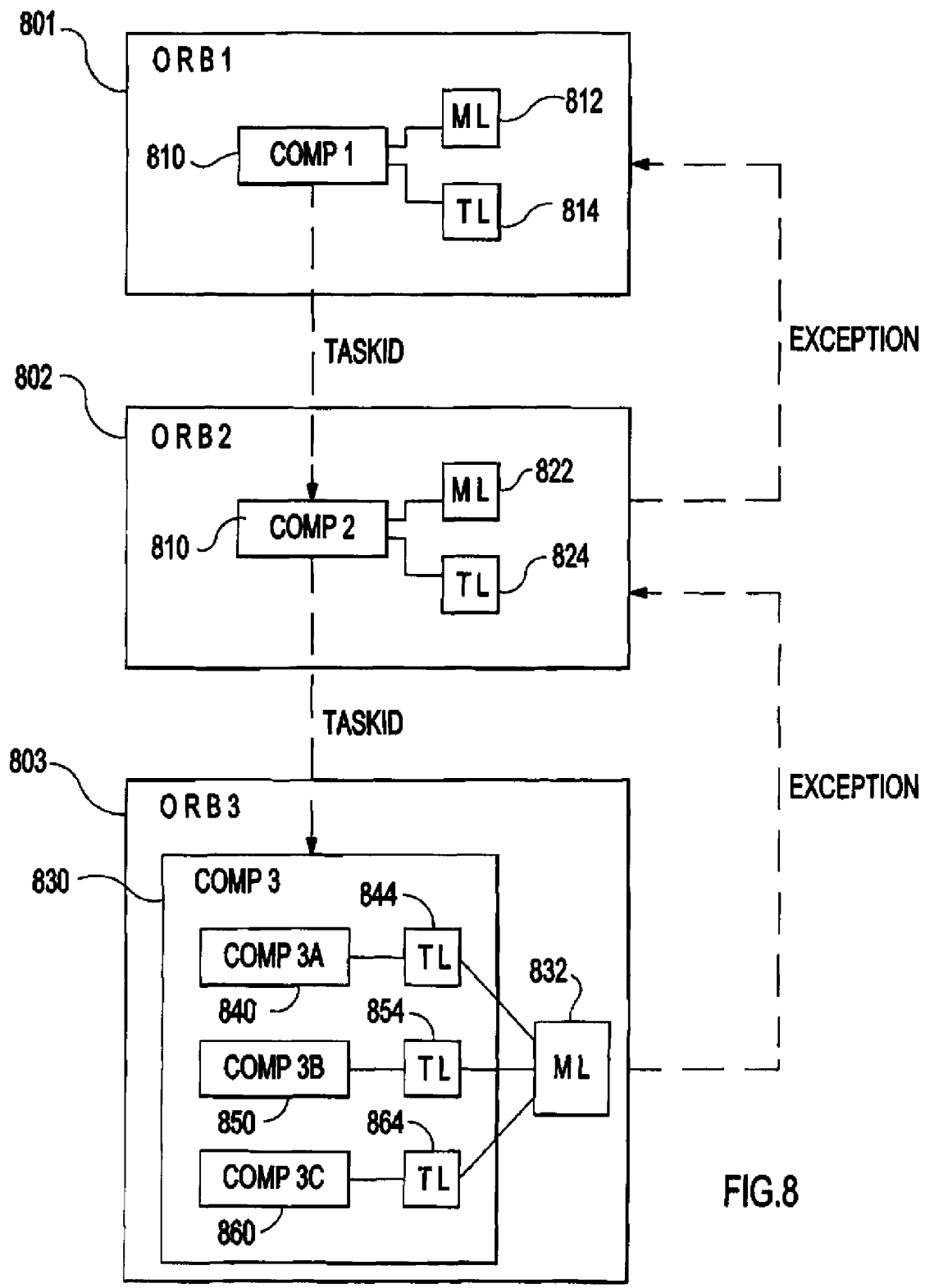
Figure 2A:
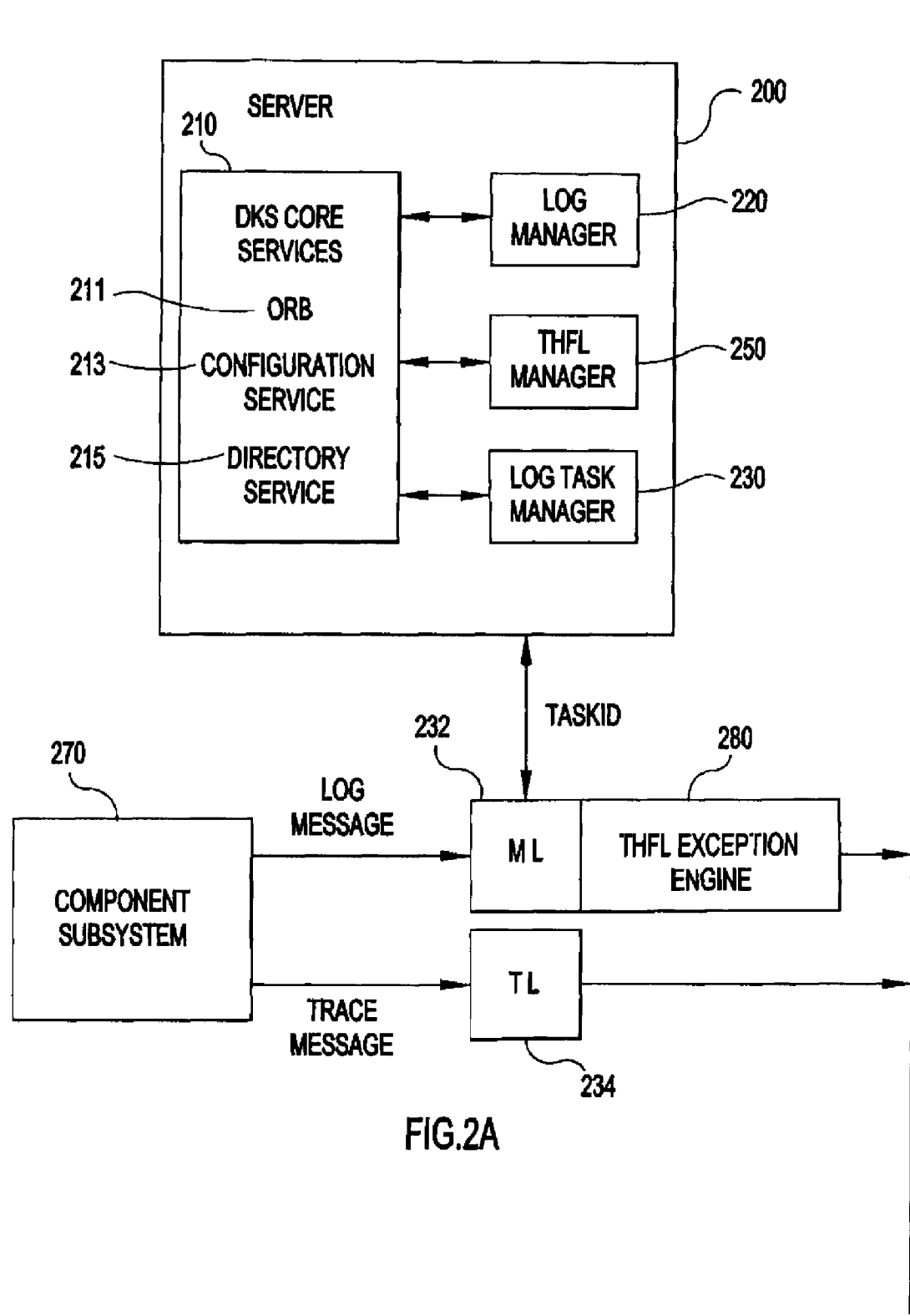
Figure 6:
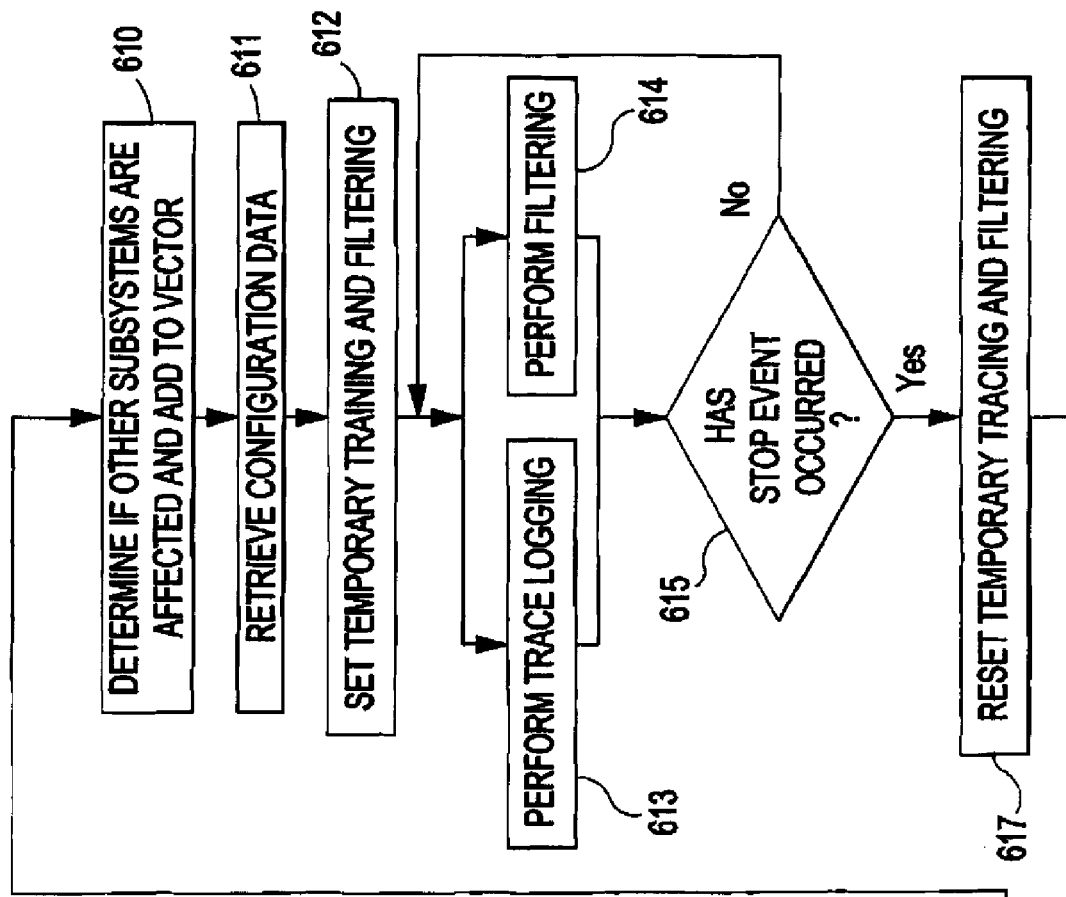
Figure 7:
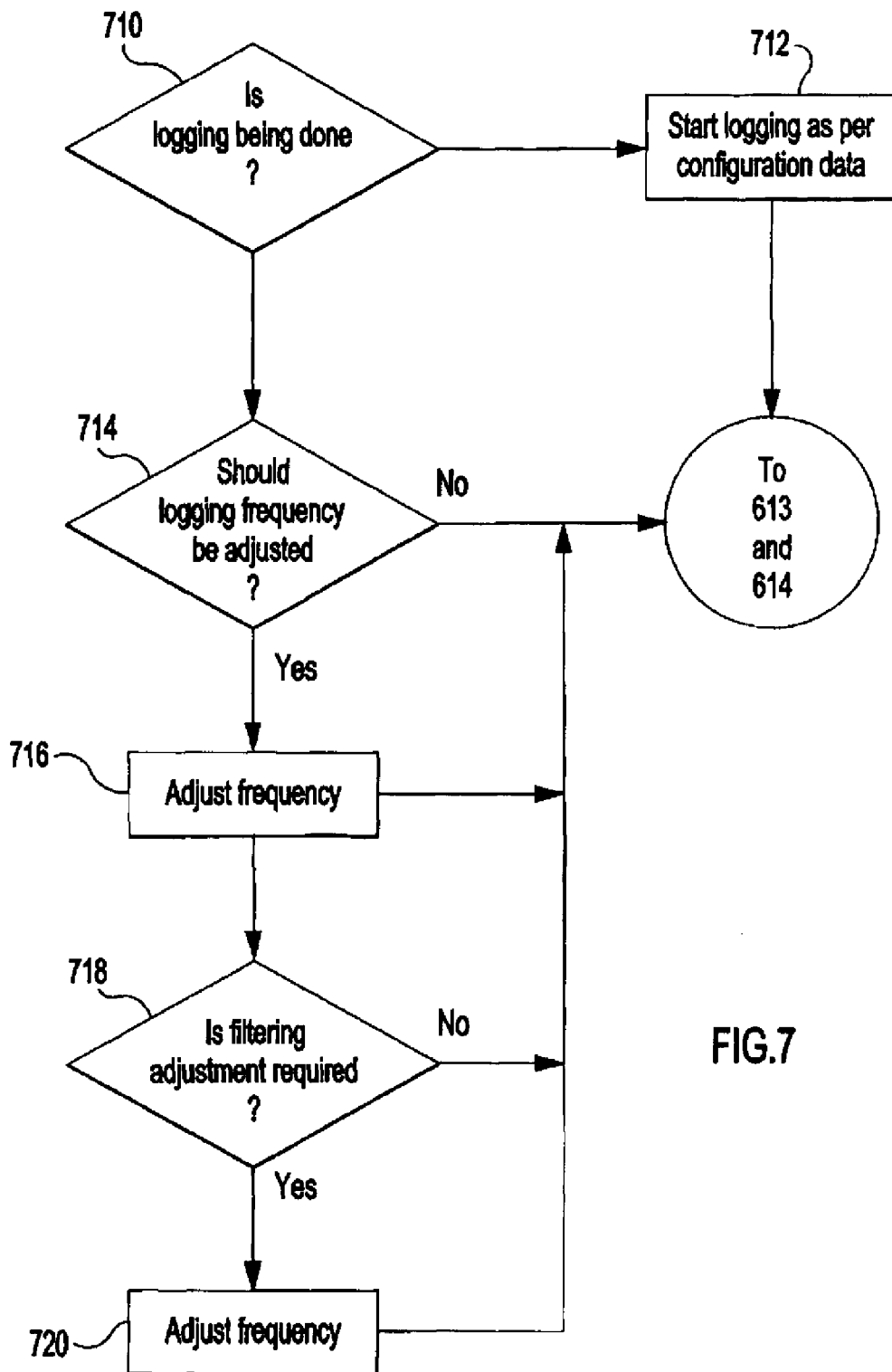
Figure 8:
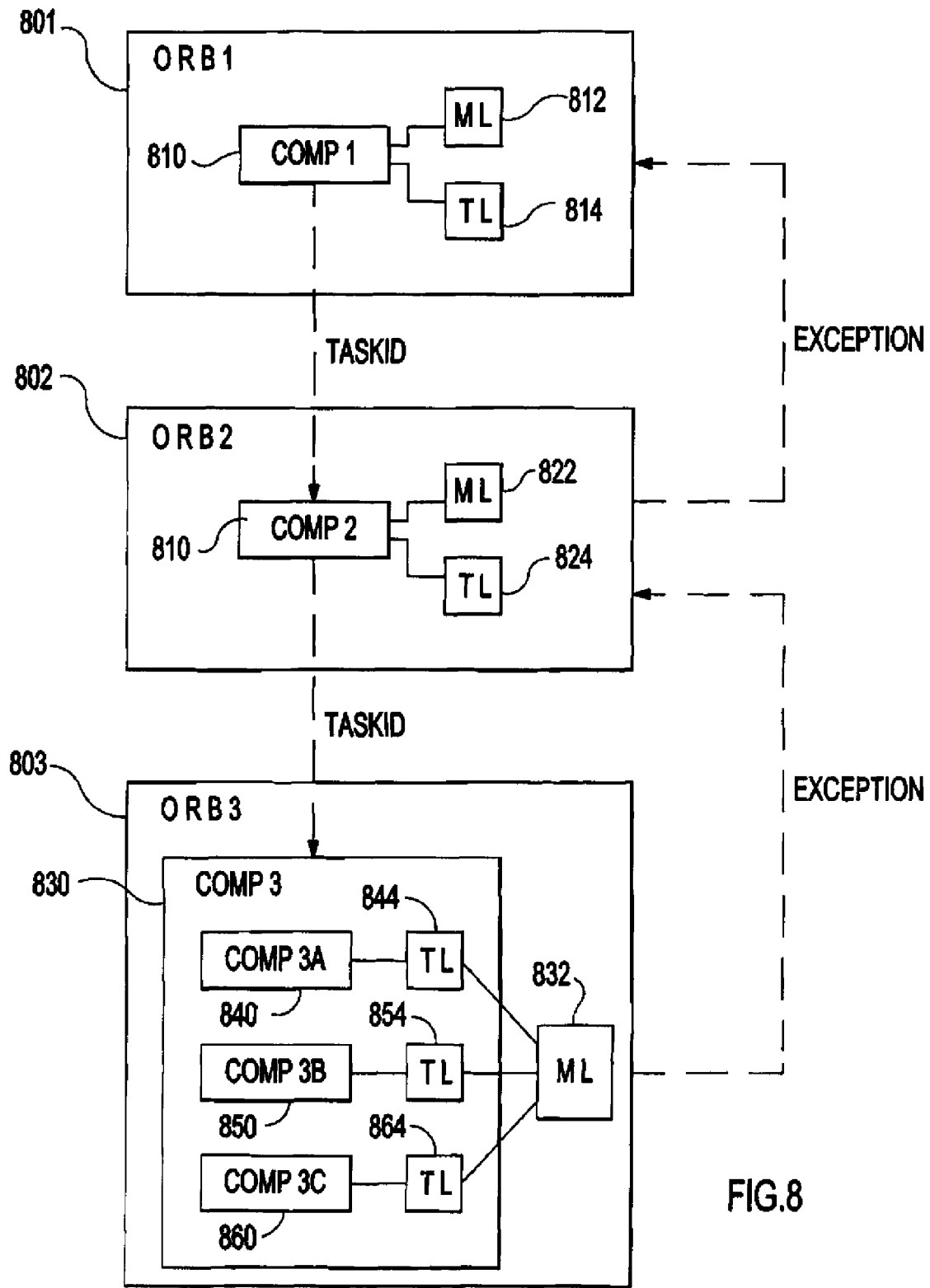

FIG. 8 provides a representative component diagram for illustrating the exception case. As depicted in FIG. 8, a task having a TaskID will start at component COMP1 810 at ORB1 801 and proceed to COMP2 820 at ORB2 802 and to COMP3 830 at ORB3 803. ORB1 at 801 includes COMP1 810 as well as message logger 812 and trace logger 814. Similarly, ORB2 at 802 includes COMP2 820 as well as message logger 822 and trace logger 824. Finally, ORB3 at 803 includes subcomponents COMP3A at 840 with its associated trace logger 844, COMP3B at 850 with its associated trace logger 854, and COMP3C at 860 with its associated trace logger 864. Each of the trace loggers at ORB3 are connected to message logger 832. After the task having TASKID has started, it proceeds from component COMP1 at 810 to COMP2 at 820 and on to COMP3 at 830.

For the purposes of this explanation, it will be assumed that during execution of the task, component COMP3A throws a THFL exception, which exception message identifies the associated trace logger 844. The immediate response is to initiate trace logging at trace logger 844. In addition, upon receipt of the exception message, the THFL exception engine, shown in FIG. 2 at 280, will respond by finding all ORBs and components affected by the exception and tracing will begin at each of those trace loggers (i.e., at trace logger 924 in ORB2 and at trace logger 914 in ORB1). Based upon existing information, not only can the affected components be identified, but the start location for the TASKID can also be identified. Since trace logging has been implemented at all of the relevant locations, and presumably all necessary information has already been gathered, the THFL exception engine next determines the start location for the task and turns tracing off where the task was created. In this way, unnecessary tracing of the processing of subsequent tasks will not be conducted.

Therefore, in accordance with the foregoing, a "stop event" for tracing in response to an exception message is the locating of the start location for the task which was executing at the time that the exception message was originally generated. All trace loggers which had been activated based on the propagation of the exception message will accordingly be turned off in response to this stop event.

The subsystem-specific selective logging and filtering, along with the dynamic adjustment of same, provide a unique and performance-sensitive approach to error detection and failure analysis, without compromising the performance of the overall system. For failure analysis, a combined report can be provided, including logging data from a plurality of locations. By specifying the time period for which logging data is desired, a combined time bounded log can be produced which gathers data from the message logger and trace logger to decrease the amount of administrative failure analysis of the system error event. The invention has been described with reference to several specific embodiments. One having skill in the relevant art will recognize that modifications may be made without departing from the spirit and scope of the invention as set forth in the appended claims.

Having thus described our invention, what we claim as new and desire to secure by letters patent is:

1. A method for providing variable frequency logging of activities in a distributed computing system comprising a plurality of computing locations having at least one message logger for monitoring messages and for generating message logger output and a plurality of selectively-enabled trace loggers capable of logging system activities from respective computing locations comprising the steps of:

detecting an event trigger comprising a message level error indicative of an error at a computing location based on message logger output;

determining the computing location at which said error occurred;

responsive to the event trigger and the determined computer location, activating a temporary logging function starting logging by a respective selectively-enabled trace logger for logging system activities for at least said one computing location at which said error occurred so that a source of said error can be determined;

logging system activities by the selectively-enabled trace logger; and terminating logging of system activities based on detection of a stop event by selectively disabling the selectively-enabled trace logger.

2. The method of claim 1 wherein said activating further comprises implementing filtering of said logging of system activities.

3. The method of claim 2 further comprising analyzing filtering of system activities to determine corrective action.

4. The method of claim 1 wherein said activating comprises altering the amount of logging done for System activities.

5. The method of claim 4 wherein said altering comprises adjusting the frequency at which logging is done on an affected subsystem at an affected location.

6. The method of claim 1 further comprising determining at least one subsystem affected by the event and wherein said activating comprises starting logging at said at least one affected subsystem.

7. The method of claim 6 wherein said determining comprises tracing from a location at which said event was detected to identify at least one subsystem affected by said event and starting logging at said at least one affected subsystem.

8. The method of claim 1 further comprising the step of accessing at least one configuration database for predefined temporary logging information.

9. The method of claim 7 further comprising the step of accessing at least one configuration database to obtain predefined temporary logging information for said subsystem.

10. Apparatus for providing selective control of variable frequency logging of activities in a distributed computing system comprising a plurality of computing locations comprising:
   a plurality of logging components comprising at least one message logger, for monitoring messages and for generating message logger output, and at least one selectively-enabled trace logger for logging system activities for each computing location;
   an event trigger detection component for detecting at least one predefined trigger event comprising a message level error indicative of an error at a computing location based on message logger output from at least one message logger;
   a logging activator responsive to input from the event trigger detection component for determining the location of said error and for temporarily activating at least one selectively-enabled trace logger of said plurality of logging components to log system activities in at least said location of said error; and
   a stop event detection component for detecting a step event and for effecting termination of logging of system activities based on detection of a stop event.

11. The apparatus of claim 10 further comprising at least one filter for filtering logged system activities for determining corrective action.

12. The apparatus of claim 10 wherein said stop event detection component comprises a timer for terminating logging after a preset time period.

13. The apparatus of claim 10 wherein said stop event detection component comprises a component for receiving user input of stop notification.

14. The apparatus of claim 10 wherein said mapping component is further adapted to determine the subsystem at which the trigger event occurred.

15. The apparatus of claim 14 wherein said mapping component is additionally adapted to identify at least one additional subsystem affected by said trigger event.

16. The apparatus of claim 14 wherein said logging activator activates logging at each of said at least one additional subsystem.

17. The apparatus of claim 10 wherein said logging activator comprises means to alter the frequency at which the logging of system activities is done.

18. A program storage device readable by machine tangibly embodying a program of instructions executable by the machine to perform a method for providing variable frequency logging of activities in a distributed computing system comprising a plurality of computing locations having at least one message logger for monitoring messages and for generating message logger output and a plurality of selectively-enabled trace loggers capable of logging system activities from respective computing locations, said method comprising the steps of: detecting an event trigger comprising a message level error indicative of an error at a computing location based on message logger output;
   determining the computing location at which said error occurred;
   responsive to the event trigger and the determined computer location, activating a temporary logging function starting logging by a respective selectively-enabled trace logger for logging system activities for at least said one Computing location at which said error occurred so that a source of said error can be determined;
   logging system activities by the selectively-enabled trace logger; and
   terminating logging of system activities based on detection of a stop event by selectively disabling the selectively-enabled trace logger.

19. The method of claim 4 wherein said altering comprises gradually adjusting said logging.

20. The method of claim 1 wherein said activating comprises dynamically setting a logging and tracing configuration for the distributed computing system based on said detected event.

21. The method of claim 20 wherein said activating further comprises implementing filtering of said logging of system activities to determine corrective action.

22. The apparatus of claim 10 wherein said logging activator comprises means for dynamically setting a logging and tracing configuration for the distributed computing system based on said detected event.

* * * * *

UNITED STATES PATENT AND TRADEMARK OFFICE
CERTIFICATE OF CORRECTION

PATENT NO. : 7,120,685 B2
APPLICATION NO. : 09/891584
DATED : October 10, 2006
INVENTOR(S) : Ullmann et al.

It is certified that error appears in the above-identified patent and that said Letters Patent is hereby corrected as shown below:

Figures 1-8 are replaced by the attached 9 Sheets with Replacement Drawings.

Signed and Sealed this

Fifth Day of May, 2009

JOHN DOLL
*Acting Director of the United States Patent and Trademark Office*

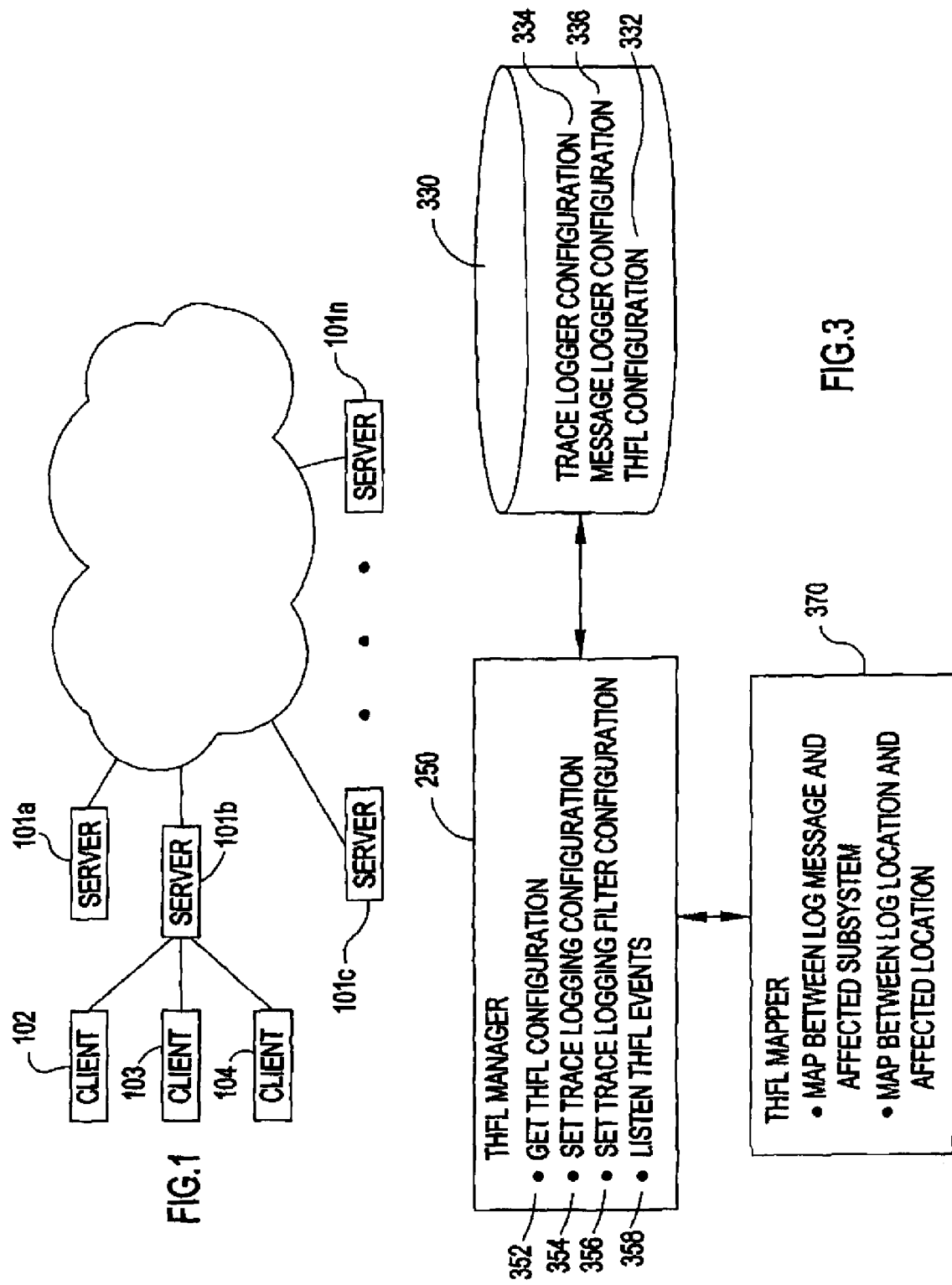

FIG.2
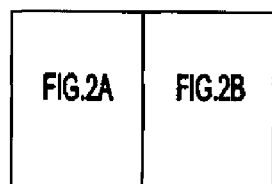
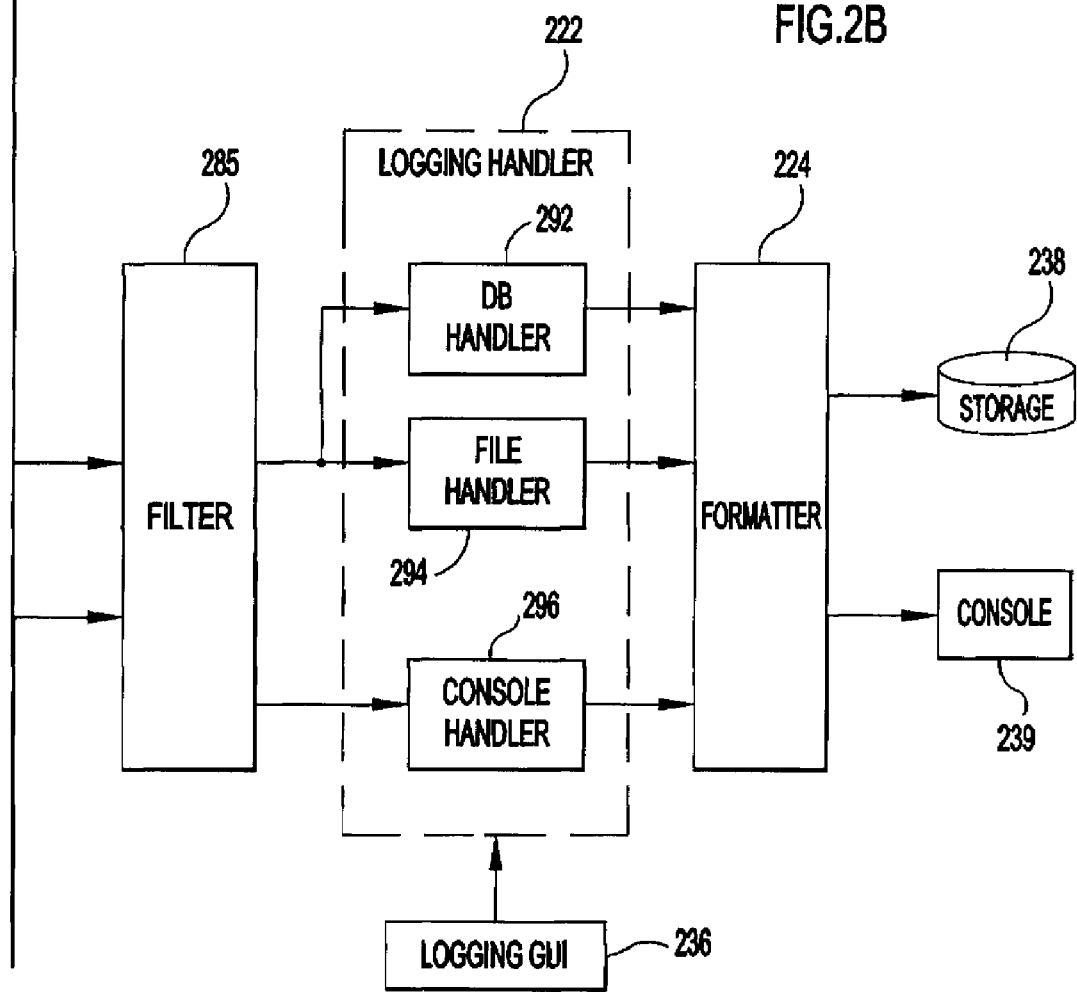

✓ Transient High Frequency Logging Configuration GUI

When to Enable Transient High Frequency Logging:

✓ Run Periodic Detection

• Daily        time of day = _____
        • Monthly    day of month = _____
        • Continuous  Polling interval every _____ minutes ✓ Enable immediately as response to ALL Error Message (very expensive from a performance standpoint)

✓ Select Subsystem(s) which error events turn on temporary tracing
        Subsystem DropDown:   Directory
                                    IP Driver
                                    ORB
                                    Etc.

Duration of Transient High Frequency Logging:

✓ (default) 1 hour after error message
    ✓ Indefinite until Administrator turns off tracing

FIG.4

FIG.5B

Details Views ForEachSubsystem

View ErrorMessage that Inititiated Increase Logging frequency:

2001.05.16  07:17:41.139 FNGDR3012E The Messaging Service for the directory running on the local ORB was unable to subscribe to event messages. No directory events can be processed by the ORB.

High Frequency Logging Interval  2001.05.16  07:17:41.139 - 2001.05.16  07:17:41.139

View MessageLog Button
ViewTraceLog Button
ViewCombinedTimeBoundLog Button

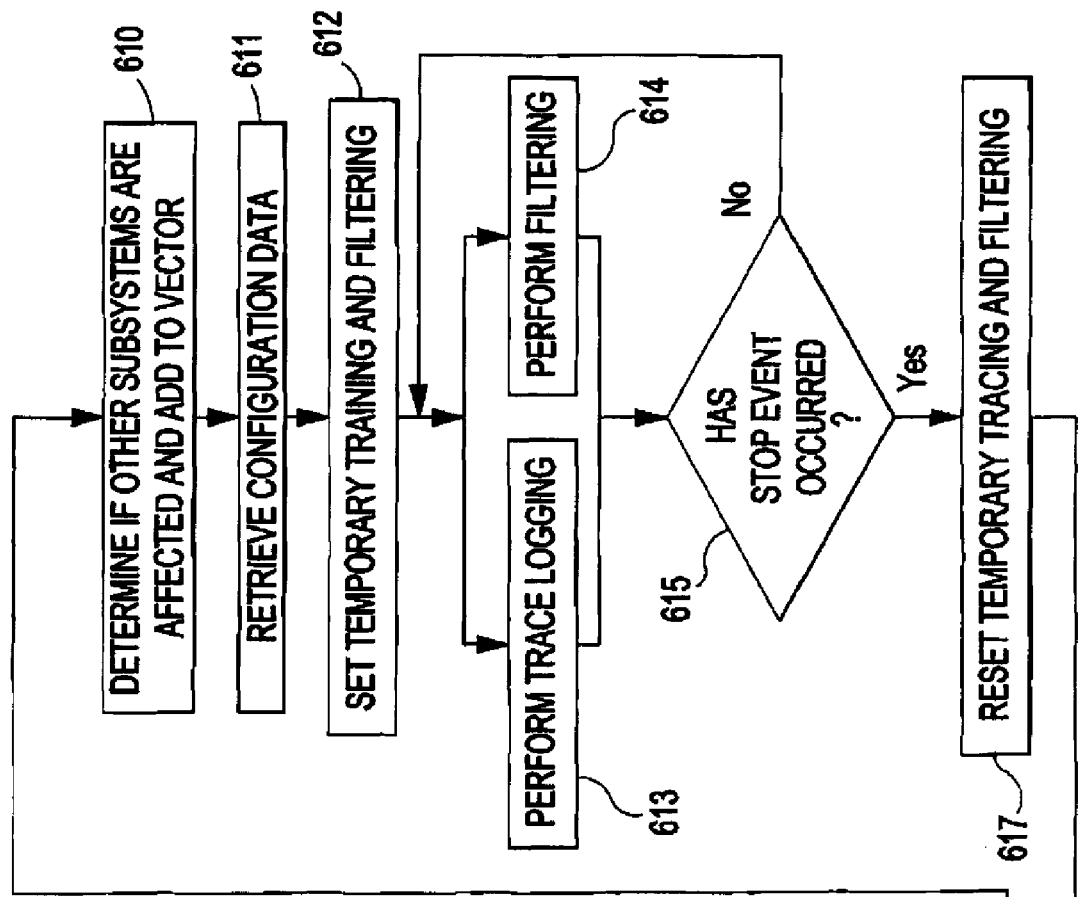
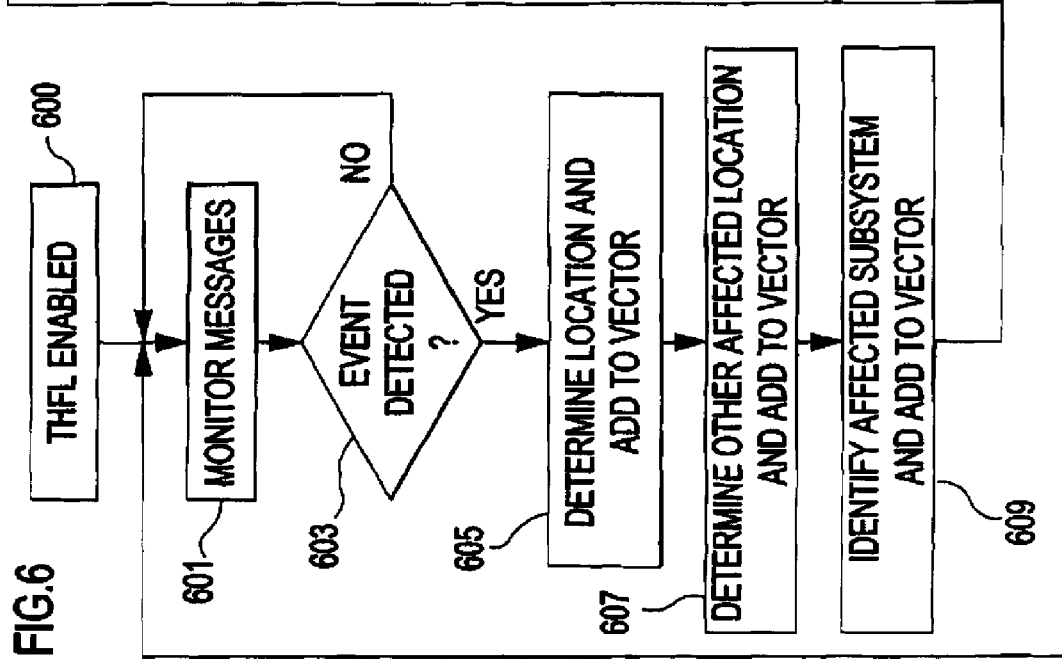
FIG.6

UNITED STATES PATENT AND TRADEMARK OFFICE
CERTIFICATE OF CORRECTION

| | | |
|---|---|---|
| PATENT NO. | : 7,120,685 B2 | |
| APPLICATION NO. | : 09/891584 | |
| DATED | : October 10, 2006 | |
| INVENTOR(S) | : Ullmann et al. | |

It is certified that error appears in the above-identified patent and that said Letters Patent is hereby corrected as shown below:

Delete the title page and substitute therefore the attached title page.

Figures 1-8 are replaced by the attached 9 Sheets with Replacement Drawings.

This certificate supersedes the Certificate of Correction issued May 5, 2009.

Signed and Sealed this

Twenty-sixth Day of May, 2009

JOHN DOLL
*Acting Director of the United States Patent and Trademark Office*

United States Patent
Ullmann et al.

(10) Patent No.: US 7,120,685 B2
(45) Date of Patent: Oct. 10, 2006

(54) METHOD AND APPARATUS FOR DYNAMIC CONFIGURABLE LOGGING OF ACTIVITIES IN A DISTRIBUTED COMPUTING SYSTEM

(75) Inventors: Lorin Evan Ullmann, Austin, TX (US); Rajeeta Lalji Shah, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 750 days.

(21) Appl. No.: 09/891,584

(22) Filed: Jun. 26, 2001

(65) Prior Publication Data
US 2002/0198983 A1 Dec. 26, 2002

(51) Int. Cl.
*G06F 15/173* (2006.01)
(52) U.S. Cl. .................... 709/224; 710/18
(58) Field of Classification Search .......... 709/224, 709/204, 223; 714/48, 45; 719/318; 707/10, 707/200; 710/8; 377/26
See application file for complete search history.

(56) References Cited

U.S. PATENT DOCUMENTS

| | | | | |
|---|---|---|---|---|
| 4,718,025 A | | 1/1988 | Minor et al. | 364/550 |
| 4,817,118 A | * | 3/1989 | Wilburn et al. | 377/26 |
| 5,504,921 A | * | 4/1996 | Dev et al. | 709/223 |
| 5,737,600 A | * | 4/1998 | Geiner et al. | 707/200 |
| 5,857,190 A | * | 1/1999 | Brown | 707/10 |
| 5,903,759 A | * | 5/1999 | Sun et al. | 717/128 |
| 5,916,300 A | * | 6/1999 | Kirk et al. | 701/213 |
| 5,974,573 A | * | 10/1999 | Martin | 714/48 |
| 6,002,871 A | * | 12/1999 | Duggan et al. | 717/135 |
| 6,430,616 B1 | * | 8/2002 | Brinnand et al. | 709/224 |
| 6,470,388 B1 | * | 10/2002 | Niemi et al. | 709/224 |
| 6,658,470 B1 | * | 12/2003 | deBardelaben | 709/224 |
| 6,738,832 B1 | * | 5/2004 | Burr et al. | 710/8 |
| 6,871,228 B1 | * | 3/2005 | Shah et al. | 709/224 |
| 6,879,995 B1 | * | 4/2005 | Chinta et al. | 709/204 |
| 2005/0028171 A1 | * | 2/2005 | Kougiouris et al. | 719/318 |
| 2005/0138083 A1 | * | 6/2005 | Smith-Semedo et al. | 707/200 |

OTHER PUBLICATIONS

Netzer, Robert H.B., "Adaptive Message Logging for Incremental Replay of Message-Passing Programs", ACM Press New York, USA, Year of Publication: 1993.*

* cited by examiner

*Primary Examiner*—John Follansbee
*Assistant Examiner*—Dustin Nguyen
(74) *Attorney, Agent, or Firm*—Jeffrey S. LaBaw; Anne Vachon Dougherty

(57) ABSTRACT

A system and method for implementing tracking of computing system activities wherein the tracking can be dynamically adjusted. The system provides a multiple level logging system having a first level for detecting message level errors and a second trace level for obtaining trace information and for filtering same to provide more details to be used for implementing corrective action. A set of filters is provide to further refine the data which is provided to a user/system administrator. The system also provides for selective activation of tracking and logging for selected subsystems, as well as the ability to vary the frequency at which the tracking is performed. The frequency of logging can be adjusted upward in response to detection of a error and can then be decreased, or the tracking selectively disabled or entirely stopped upon detection of a stop event.

22 Claims, 7 Drawing Sheets

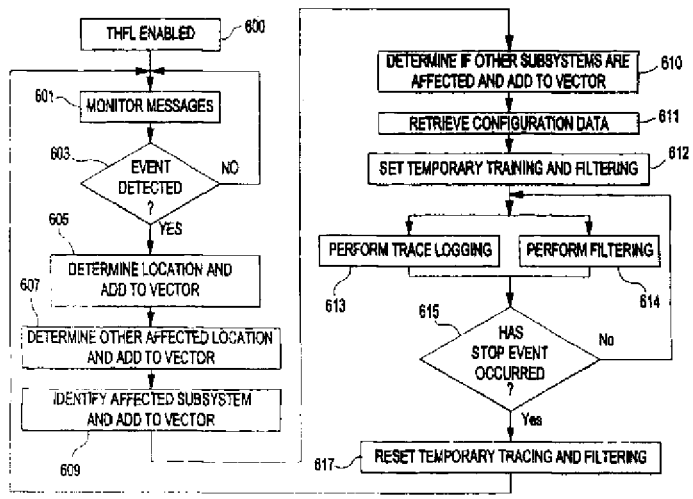

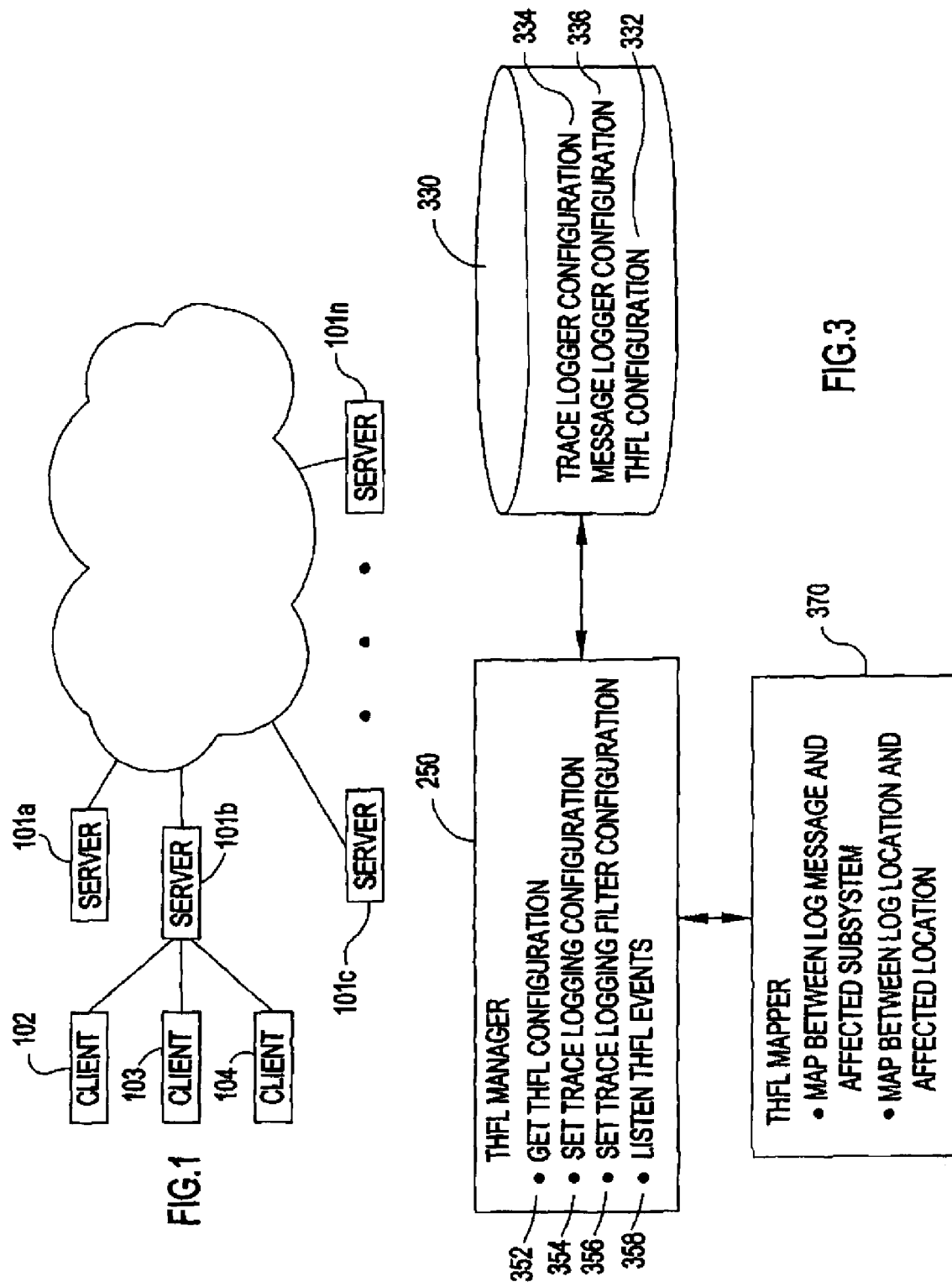

✓ Transient High Frequency Logging Configuration GUI

When to Enable Transient High Frequency Logging:

✓ Run Periodic Detection

• Daily      time of day = _____
      • Monthly   day of month = _____
      • Continuous  Polling interval every _____ minutes ✓ Enable immediately as response to ALL Error Message (very expensive from a performance standpoint)

✓ Select Subsystem(s) which error events turn on temporary tracing
      Subsystem DropDown:  Directory
                               IP Driver
                               ORB
                               Etc.

Duration of Transient High Frequency Logging:

✓ (default) 1 hour after error message
   ✓ Indefinite until Administrator turns off tracing

FIG.4

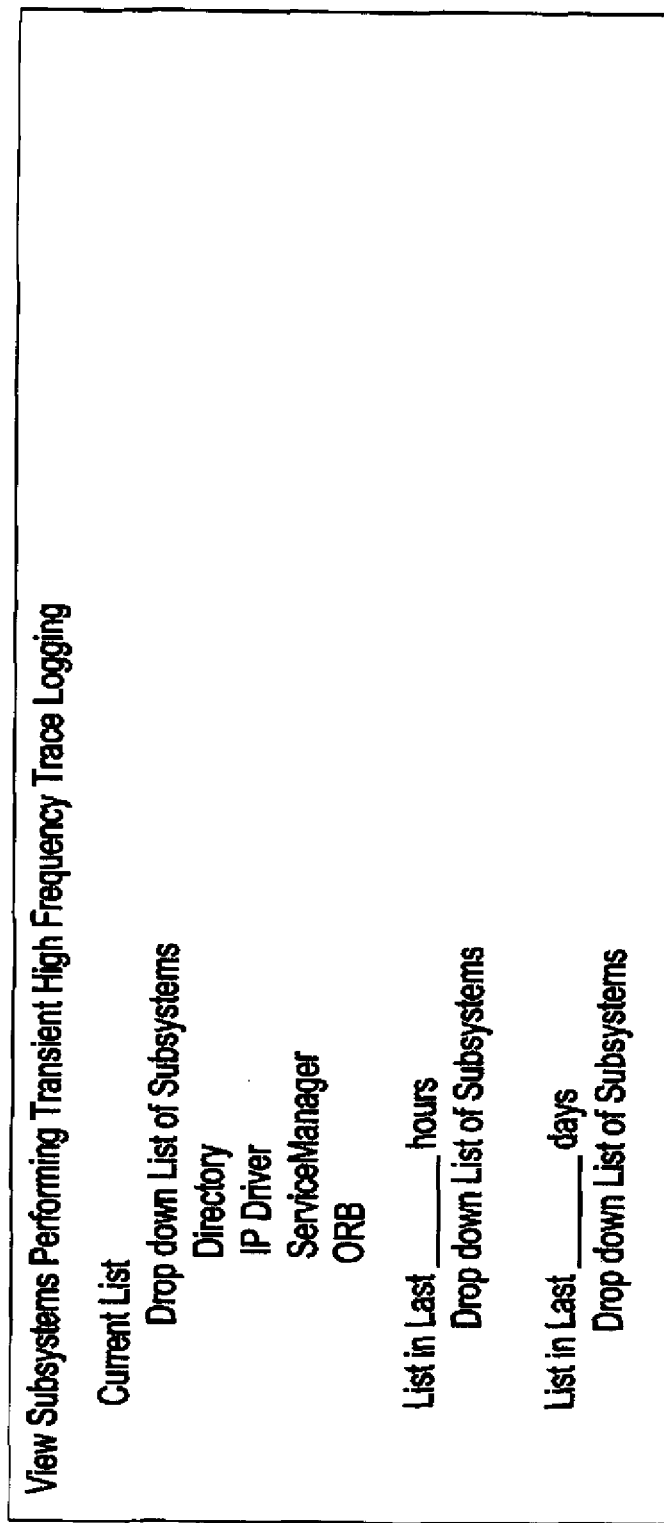

FIG.5B

Details Views ForEachSubsystem

View ErrorMessage that Inititiated Increase Logging frequency:

2001.05.16 07:17:41.139 FNGDR3012E The Messaging Service for the directory running on the local ORB was unable to subscribe to event messages. No directory events can be processed by the ORB.

High Frequency Logging Interval 2001.05.16 07:17:41.139 - 2001.05.16 07:17:41.139

View MessageLog Button
ViewTraceLog Button
ViewCombinedTimeBoundLog Button

UNITED STATES PATENT AND TRADEMARK OFFICE
CERTIFICATE OF CORRECTION

| | |
|---|---|
| PATENT NO. | : 7,120,685 B2 |
| APPLICATION NO. | : 09/891584 |
| DATED | : October 10, 2006 |
| INVENTOR(S) | : Ullmann et al. |

It is certified that error appears in the above-identified patent and that said Letters Patent is hereby corrected as shown below:

Delete the title page and substitute therefore the attached title page.

Figures 1-8 are replaced by the attached 9 Sheets with Replacement Drawings.

This certificate supersedes the Certificates of Correction issued May 5, 2009 and May 26, 2009.

Signed and Sealed this

Sixteenth Day of June, 2009

JOHN DOLL
*Acting Director of the United States Patent and Trademark Office*

United States Patent
Ullmann et al.

(10) Patent No.: US 7,120,685 B2
(45) Date of Patent: Oct. 10, 2006

(54) METHOD AND APPARATUS FOR DYNAMIC CONFIGURABLE LOGGING OF ACTIVITIES IN A DISTRIBUTED COMPUTING SYSTEM

(75) Inventors: Lorin Evan Ullmann, Austin, TX (US); Rajeeta Lalji Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/891,584

(22) Filed: Jun. 26, 2001

(65) Prior Publication Data
US 2002/0198983 A1  Dec. 26, 2002

(51) Int. Cl.
*G06F 15/173* (2006.01)
(52) U.S. Cl. ............................... 709/224; 710/18
(58) Field of Classification Search ............ 709/224, 709/204, 223; 714/48, 45; 719/318; 707/10, 707/200; 710/8; 377/26
See application file for complete search history.

(56) References Cited

U.S. PATENT DOCUMENTS

| | | | | |
|---|---|---|---|---|
| 4,718,025 | A | | 1/1988 | Minor et al. ............ 364/550 |
| 4,817,118 | A | * | 3/1989 | Wilburn et al. ............ 377/26 |
| 5,504,921 | A | * | 4/1996 | Dev et al. ............ 709/223 |
| 5,737,600 | A | * | 4/1998 | Geiner et al. ............ 707/200 |
| 5,857,190 | A | * | 1/1999 | Brown ............ 707/10 |
| 5,903,759 | A | * | 5/1999 | Sun et al. ............ 717/128 |
| 5,916,300 | A | * | 6/1999 | Kirk et al. ............ 701/213 |
| 5,974,573 | A | * | 10/1999 | Martin ............ 714/48 |
| 6,002,871 | A | * | 12/1999 | Duggan et al. ............ 717/135 |
| 6,430,616 | B1 | * | 8/2002 | Brinnand et al. ............ 709/224 |
| 6,470,388 | B1 | * | 10/2002 | Niemi et al. ............ 709/224 |
| 6,658,470 | B1 | * | 12/2003 | deBardelaben ............ 709/224 |
| 6,738,832 | B1 | * | 5/2004 | Burr et al. ............ 710/8 |
| 6,871,228 | B1 | * | 3/2005 | Shah et al. ............ 709/224 |
| 6,879,995 | B1 | * | 4/2005 | Chinta et al. ............ 709/204 |
| 2005/0028171 | A1 | * | 2/2005 | Kougiouris et al. ............ 719/318 |
| 2005/0138083 | A1 | * | 6/2005 | Smith-Semedo et al. ............ 707/200 |

OTHER PUBLICATIONS

Netzer, Robert H.B., "Adaptive Message Logging for Incremental Replay of Message-Passing Programs", ACM Press New York, USA, Year of Publication: 1993.*

* cited by examiner

*Primary Examiner*—John Follansbee
*Assistant Examiner*—Dustin Nguyen
(74) *Attorney, Agent, or Firm*—Jeffrey S. LaBaw; Anne Vachon Dougherty

(57) ABSTRACT

A system and method for implementing tracking of computing system activities wherein the tracking can be dynamically adjusted. The system provides a multiple level logging system having a first level for detecting message level errors and a second trace level for obtaining trace information and for filtering same to provide more details to be used for implementing corrective action. A set of filters is provide to further refine the data which is provided to a user/system administrator. The system also provides for selective activation of tracking and logging for selected subsystems, as well as the ability to vary the frequency at which the tracking is performed. The frequency of logging can be adjusted upward in response to detection of a error and can then be decreased, or the tracking selectively disabled or entirely stopped upon detection of a stop event.

22 Claims, 9 Drawing Sheets

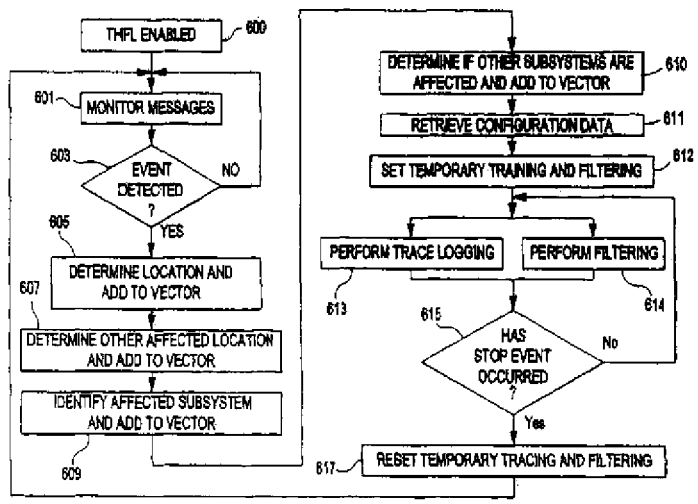

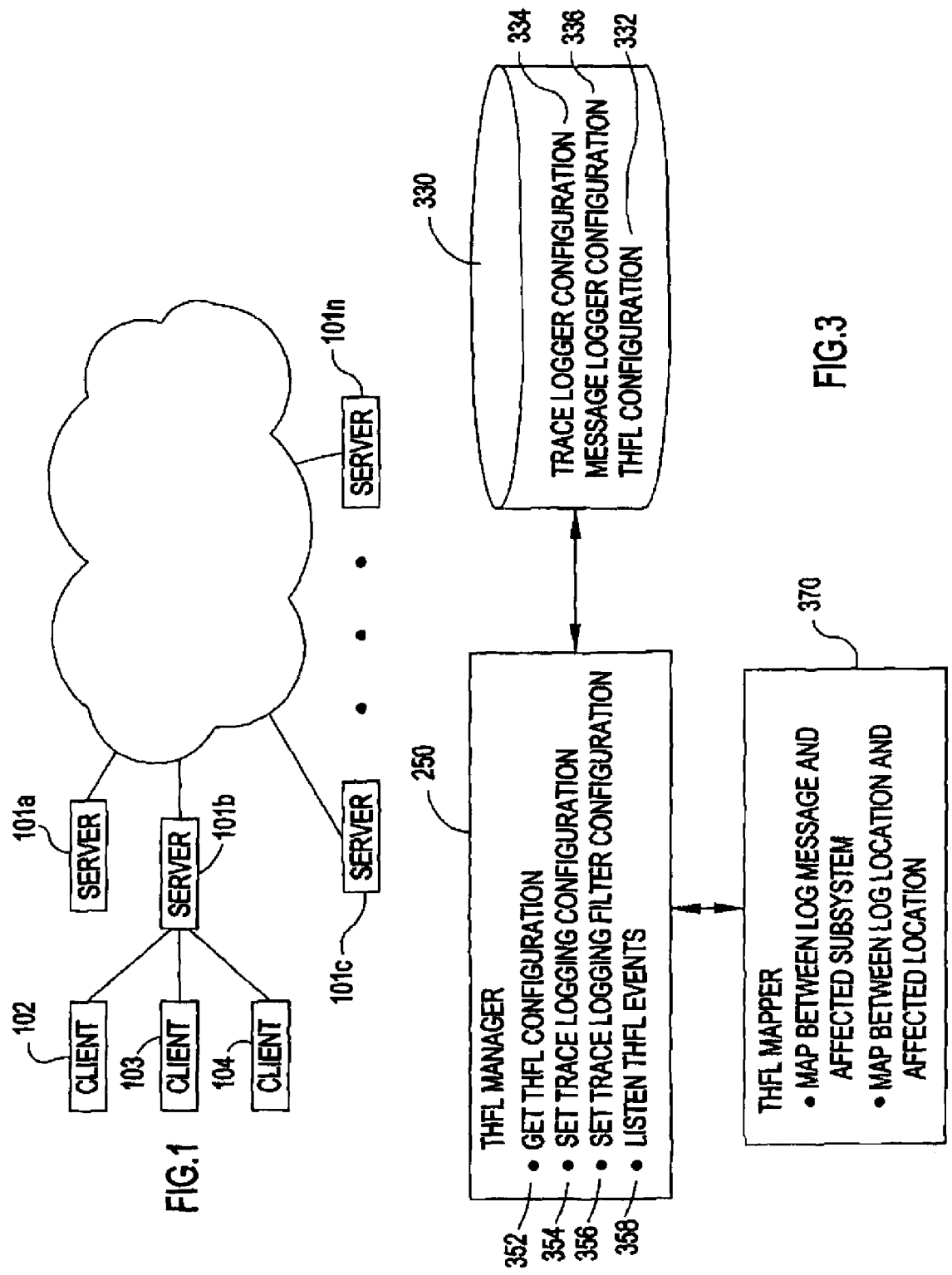

FIG.2
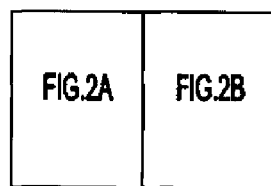
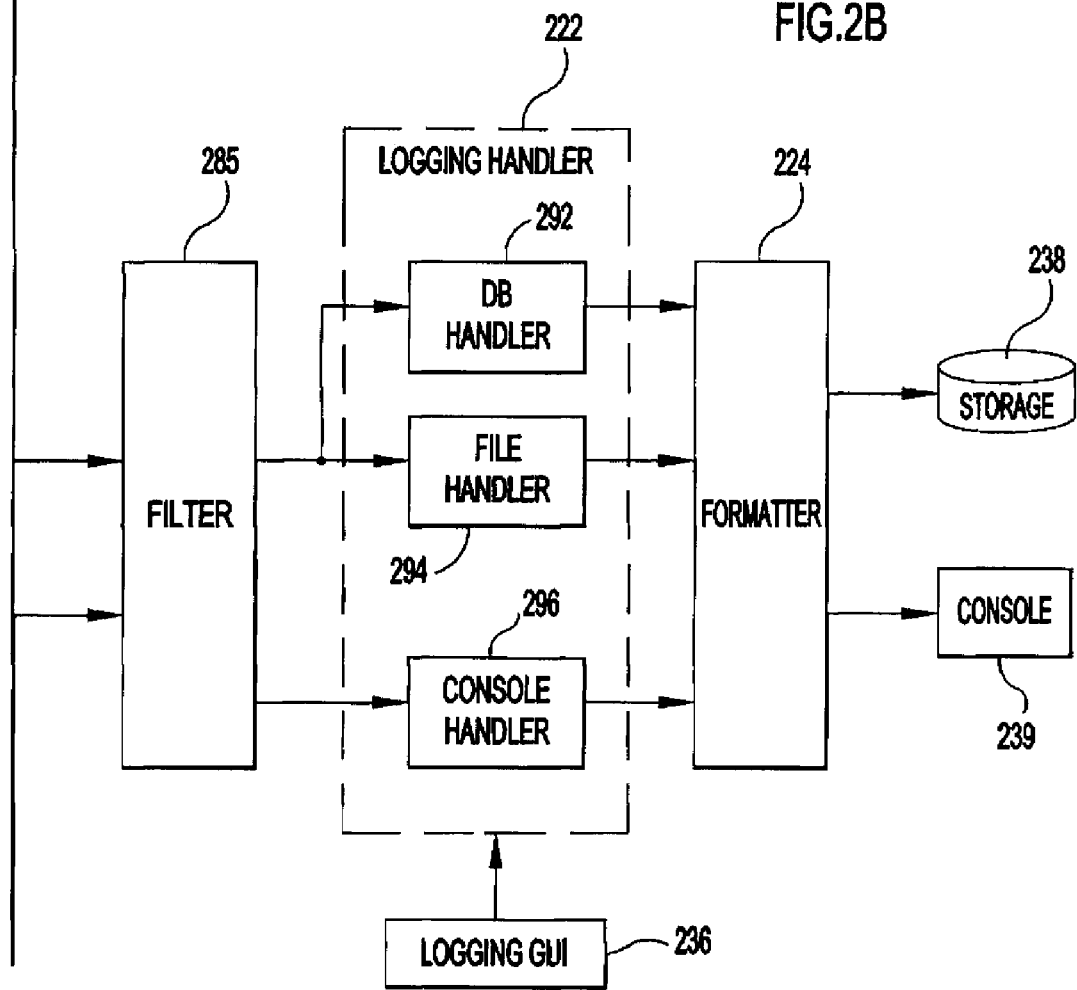

✓ Transient High Frequency Logging Configuration GUI

When to Enable Transient High Frequency Logging:

☐ Run Periodic Detection
- Daily     time of day = _____
- Monthly     day of month = _____
- Continuous     Polling interval every _____ minutes ☐ Enable immediately as response to ALL Error Message (very expensive from a performance standpoint)

☐ Select Subsystem(s) which error events turn on temporary tracing
    Subsystem DropDown:    Directory
                                IP Driver
                                ORB
                                Etc.

Duration of Transient High Frequency Logging:

☐ (default) 1 hour after error message
☐ Indefinite until Administrator turns off tracing

FIG.4

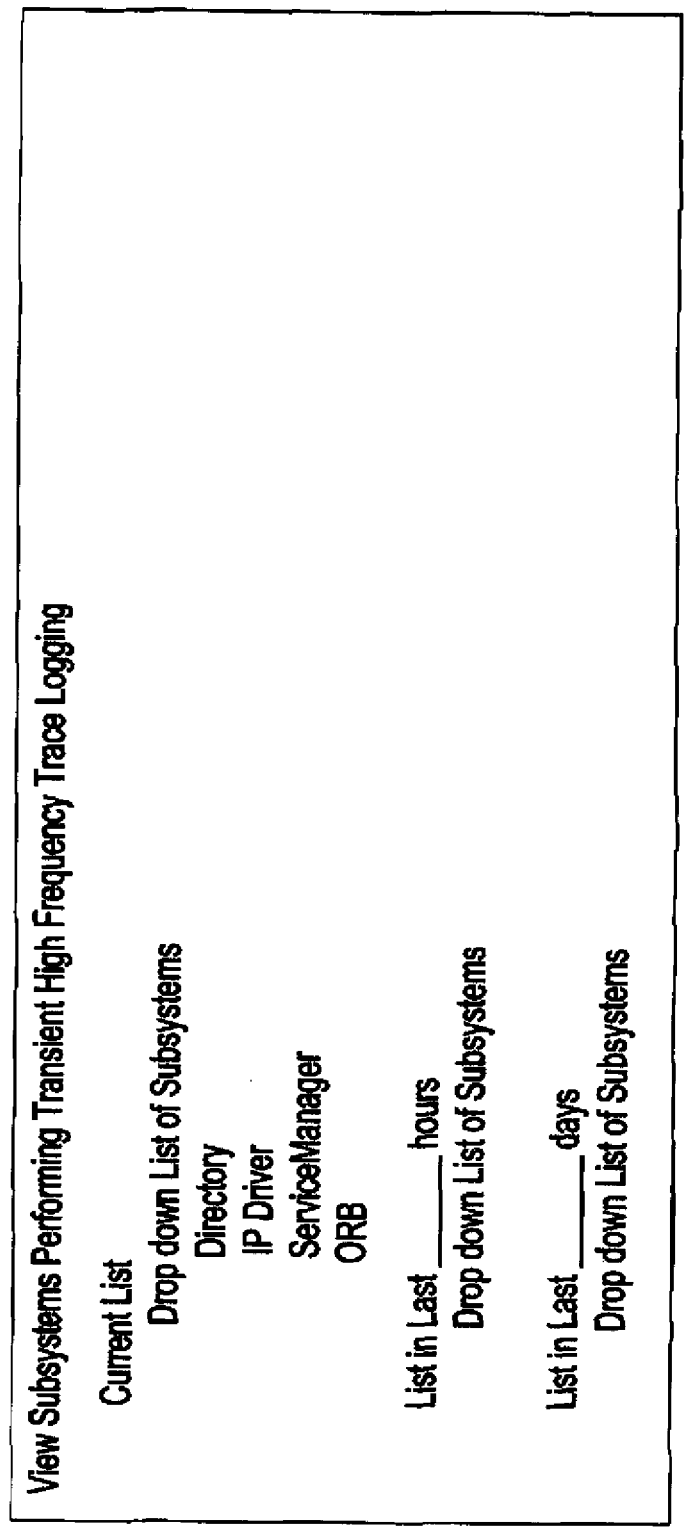

FIG.5B

Details Views ForEachSubsystem

View ErrorMessage that Initiated Increase Logging frequency:

2001.05.16 07:17:41.139 FNGDR3012E The Messaging Service for the directory running on the local ORB was unable to subscribe to event messages. No directory events can be processed by the ORB.

High Frequency Logging Interval 2001.05.16 07:17:41.139 - 2001.05.16 07:17:41.139

View MessageLog Button
ViewTraceLog Button
ViewCombinedTimeBoundLog Button